United States Patent [19]

Romi

[11] Patent Number: 4,665,783
[45] Date of Patent: May 19, 1987

[54] PROCESS AND DEVICE FOR COPYING AND THREADING IN AUTOMATIC SQUARE CYCLE

[75] Inventor: Romeu Romi, Santa Barbara d'Oeste, Brazil

[73] Assignee: Industrias Romi S/A, Santa Barbara d'Oeste, Brazil

[21] Appl. No.: 723,623

[22] Filed: Apr. 15, 1985

Related U.S. Application Data

[63] Continuation-in-part of Ser. No. 412,854, Aug. 30, 1982, abandoned.

[30] Foreign Application Priority Data

Sep. 3, 1981 [BR] Brazil ................... 8105647

[51] Int. Cl.$^4$ .................... B23B 3/28; B23G 1/00; B23G 3/08
[52] U.S. Cl. ........................... 82/5; 82/14 C
[58] Field of Search ............ 82/5, 14 A, 14 B, 14 C, 82/17, 11

[56] References Cited

U.S. PATENT DOCUMENTS

| | | | |
|---|---|---|---|
| 3,026,680 | 3/1962 | Evans | 82/14 A |
| 3,087,365 | 4/1963 | Rose et al. | 82/5 |
| 3,147,655 | 9/1964 | Honekamp | 82/5 |
| 3,279,288 | 10/1966 | Mannaioni | 82/14 A |
| 3,501,984 | 3/1970 | Hofmann | 82/5 |
| 3,690,200 | 9/1972 | Weaver | 82/14 A |
| 3,972,251 | 8/1976 | Gorman et al. | 82/17 |
| 4,025,764 | 5/1977 | Tack | 82/5 |
| 4,036,086 | 7/1977 | Thumm et al. | 82/5 |
| 4,253,358 | 3/1981 | Schulze | 82/5 |

*Primary Examiner*—Nicholas P. Godici
*Assistant Examiner*—Jerry Kearns
*Attorney, Agent, or Firm*—Michael J. Striker

[57] ABSTRACT

A process for copying and threading in automatic square cycle, applicable to and/or incorporated into engine lathes in general, includes material removing machining of parts by copying method in automatic square cycle, providing during the machining an automatic feed system for depth of cut with programmable and progressive increments through electric means, cutting of threads on a surface of the machined parts in automatic square cycle, and providing during the cutting an automatic feed system for depth of cut with programmable and progressive increments through electric means. A device for the process includes a longitudinal carriage with a cross slide having a bottom swiveling support and a copy carriage mounted to the latter, a longitudinal support for a tool with a tool holder and attached on an upper swiveling support fixed on an upper face of the copy carriage, a movable first arm fixed at a corner of the copy carriage, a head equipped with a copy valve having a stylus and an assembly mounting templates, a hydraulic unit mounted on the longitudinal carriage, first and second sets of time relays mounted on a programming panel, a first set of electric switches for programming the first set of time relays of the automatic feed system for depth of cut when in copying cycle, a second set of electric switches for programming the second set of time relays of the automatic feed system for depth of cut when in thread cutting cycle, and a control panel containing an electric selecting switch for pre-positioning of copy and thread cutting automatic cycles and a button for starting the automatic cycle.

9 Claims, 19 Drawing Figures

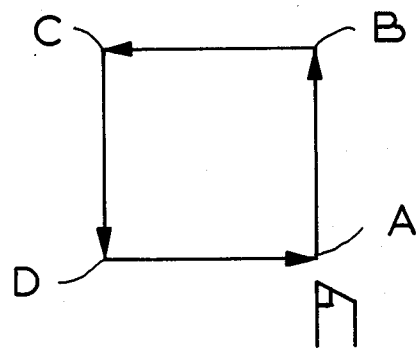
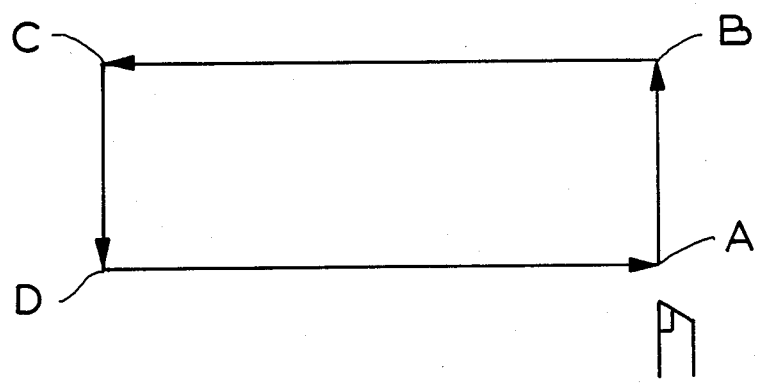
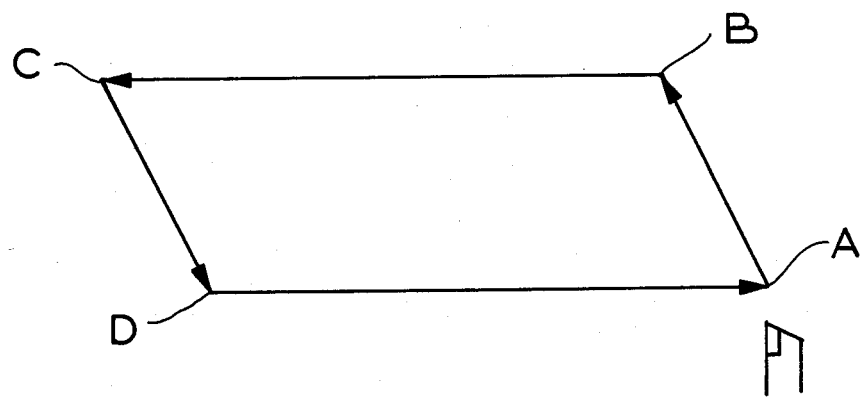
F I G. 19

PROCESS AND DEVICE FOR COPYING AND THREADING IN AUTOMATIC SQUARE CYCLE

REFERENCE TO RELATED APPLICATION

This application is a continuation-in-part of the application Ser. No. 412,854, filed Aug. 30, 1982 and now abandoned.

BACKGROUND OF THE INVENTION

The present invention refers to a system for copying and threading in automatic square cycle that can be applied and/or incorporated to engine lathes in general.

The invention is applicable and/or incorporated whenever it is required to turn certain shapes of cylindrical parts by copying and subsequently cut a cylindrical or taper thread or merely cut a cylindrical or taper thread through automatic square cycle. Threads usually are cut on engine lathes under completely manual machining cycles and in some cases semi automatic cycles with operator's intervention on the lathe controls during the threading cycle.

SUMMARY OF THE INVENTION

It is an object of the invention to provide a process and a device through which a cylindrical or taper thread can be cut from beginning to end by completely automatic cycle without any operator's intervention during the machining cycle.

Another object of the invention is to provide a turning or machining system capable of reproducing the profile of the workpiece to be thread cut by copy turning in automatic square cycle.

It is a further object of the invention to provide an automatic system for the mechanical feeding for depth of cut in increments and pro-programmed through electric means.

Still another object of the invention is to provide means for limiting beginning and end of travel of the servo assisted support for the templates guiding the stylus.

Yet another object of the invention is to provide means for micrometric displacements of the template supports in two directions in right angle to each other and for angular adjustment movements for the correct work positioning of said templates.

A further object of the invention is to provide means for positioning movements of the copying valve support to enable exploring two different templates mounted in different planes to meet copying and threading requirements.

Still a further object of the invention is to provide the incorporation of hydraulic unit to operate the copying and threading cycles on the longitudinal carriage, making it possible to use rigid pipes instead of flexible tubes or hoses between the hydraulic unit and the longitudinal carriage.

It is also an object of the present invention that after the device is incorporated to the lathe it will allow the operator to perform normal machining work that does not require automatic cycles.

The present invention incorporates mechanic, hydraulic and electric interconnecting controls that enable to reproduce in the workpiece the template or masterpiece profile by copying in automatic square cycle and immediately after to cut threads also by automatic square cycle.

The copying cycle is as follows: by pressing an electric start button, the main spindle starts rotating and simultaneously the copying carriage driven by the oil that enters into the chamber of the carriage hydraulic cylinder moves at rapid traverse from a starting or standstill position towards the workpiece until the cutting tool edge approaches the workpiece. When the cutting tool edge comes close to the workpiece a travel limit microswitch actuates a solenoid that upon acting on the hydraulic copying valve changes the copying carriage travel from rapid to slow operating travel and said copying carriage continues to move until the stylus of the hydraulic copying valve touches the template profile. When the stylus touches the template profile, the copying valve piston is in such a position that it starts distributing oil to the two chambers of the copying carriage hydraulic cylinder at a rated volume and pressure in accordance with the resulting areas of the cylinder and its piston in order to maintain the system balanced and to stop cross or angled travel of the copying carriage on top of which the tool post is mounted.

At the same time the above described movement occurs, the longitudinal carriage moves at slow work feed parallel to the workpiece axis. Cross or inclined movement of the copying carriage in conjunction with longitudinal movement of the longitudinal carriage make the cutting tool edge start from the point of departure or rest and travel to the point of starting the cut. At this point, cross or inclined movement of the copying carriage is interrupted by the stylus contact to the template profile. The longitudinal carriage continues traveling covering the required distance for machining the workpiece. During this travel of the longitudinal carriage, the stylus explores the template profile and its movement actuates the copying valve piston that controls the oil flow in the two chambers of the hydraulic cylinder, performing the cross or inclined movement of the copying carriage. The cross or inclined movement of the copying carriage follows the template profile and causes the tool to reproduce in the workpiece the same profile. When the longitudinal carriage reaches the end of the machining travel, another travel limit switch is actuated and energizes a solenoid that simultaneously commands the copying valve for return of the copying carriage at either cross or inclined movement at rapid traverse in the opposite direction, withdrawing from the workpiece; commands the fast reverse direction of travel of the longitudinal carriage, moving the longitudinal carriage from the end of machining travel toward the point of departure or rest; commands the operation of an electric switch which starts a variable speed motor which turns a screw that moves the template support through a nut coupled to this screw. The electric switch that starts the motor is controlled by an electric programming system consisting of selecting switches and time relays so that in the event of using direct current motors, the current is entered at intensity controlled by the motor and for a determined period of time so that the screw turns only a fraction of a turn and causes a limited displacement to the template support as previously adjusted in the programming system. With the described displacement of the template, the stylus takes position different from the previous one and this results in a new position of the copying carriage when the stylus touches again the template profile. This displacement is called cutting increment and corresponds to the depth of cut that must be made by the tool in the next pass. When the carriage reaches the starting or departure point, another travel limit switch is actuated which controls simultaneously the following movements:

starting rapid traverse of copying carriage toward the workpiece;

starting of longitudinal carriage movement in a direction parallel to the workpiece axis.

These movements are repeated successively until the copying carriage reaches the programmed point as the last pass, and at this point is actuates another travel limit switch, which is programmed for stopping the machine after the tool has travelled all the machining path and returned to the starting or resting point.

After completing the copying cycle, a program must be prepared for the thread cutting cycle which requires the following:

to turn the electric selecting switch from copying to the "threading" position.

to disengage the carriage mechanical travel by positioning the feed engaging lever in the "Neutral" position.

to position the leadscrew half-nuts engaging lever in the "engaged" position.

to position thread box levers in accordance with the desired threads.

to index the square tool post to have the thread cutting tool in working position.

the thread cutting cycle is similar to the copying cycle except for the following:

that the previously positioned travel limit switches limit the cutting tool passes just over the section to be thread cut on the workpiece.

that the increment of depth of cut previously selected on the programming electric panel for thread cutting will be different from the one used for copying and it will be in accordance with what is required depending on the material, type of thread and tool used.

that longitudinal carriage movement in both directions is driven by the leadscrew and the leadscrew reverse rotation is driven by a mechanism connected or incorporated to the lathe headstock while for copying, carriage movement is driven by the feel rod.

When the threading cycle ends and the tool returns to the point of departure, a travel limit electric switch is actuated. This switch is programmed to control the electric switch that starts the variable speed motor that rotates at high speed and at a direction opposite to the one it was rotating during the work cycle, causing the template support to return to its initial position and ready to start the next copying cycle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 19 is a sketch showing an automatic square cycle preformed by a tool of the device.

DETAILED DESCRIPTION OF THE PREFERRED EMBODIMENTS

Figure 1:
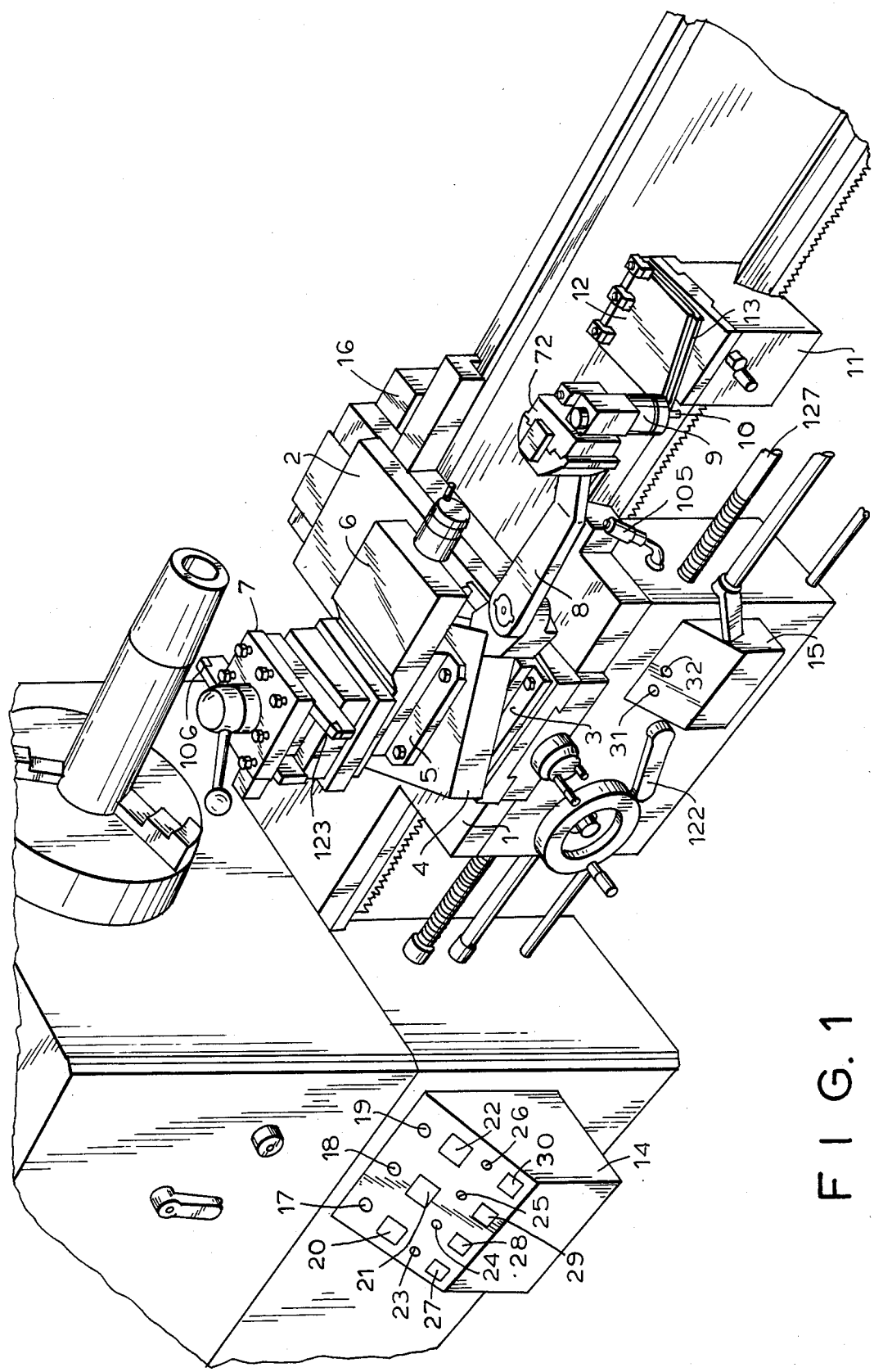
FIG. 1 is a general perspective view of the device.

As illustrated in the drawings, the device consists of a longitudinal carriage 1 on which are mounted compound rest 2, lower swivel support 3, copying carriage 4, top swivel support 5, longitudinal support 6, tool post 7, arm 8 that supports copying valve 9, which valve is provided with stylus 10, assembly 11 where templates 12 and 13 are mounted, programming electric panel 14, control panel 15, hydraulic unit 16 mounted on longitudinal carriage 1 and a set of travel limit microswitches for limiting travel of longitudinal carriage, copying carriage and template supports. On the programming panel 14 are located electric switches 17, 18 and 19 for selecting the number of passes and time relays 20, 21 and 22 for selecting the tool depth of cut when in the copying cycle and electric switches 23, 24, 25 and 26 for selecting the number of passes and time relays 27, 28, 29 and 30 for selecting the tool depth of cut when in threading cycle. On control panel 15 are electric switch 31 for pre-selection of automatic copying and threading cycles, and button 32 for starting the machine in automatic cycle.

Figure 5:
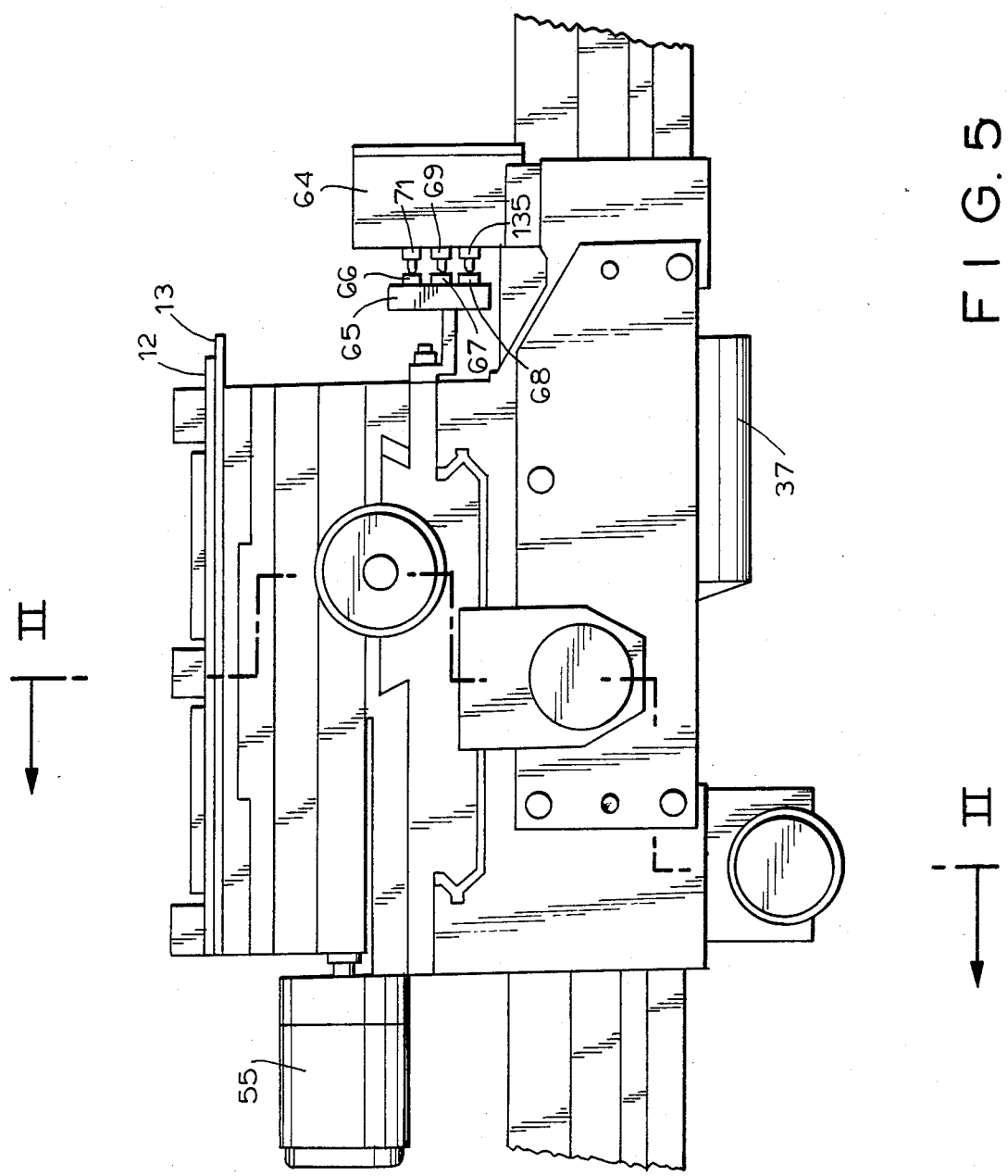
FIG. 5 is a front view of assembly 11 where the templates are mounted.
Figure 6:
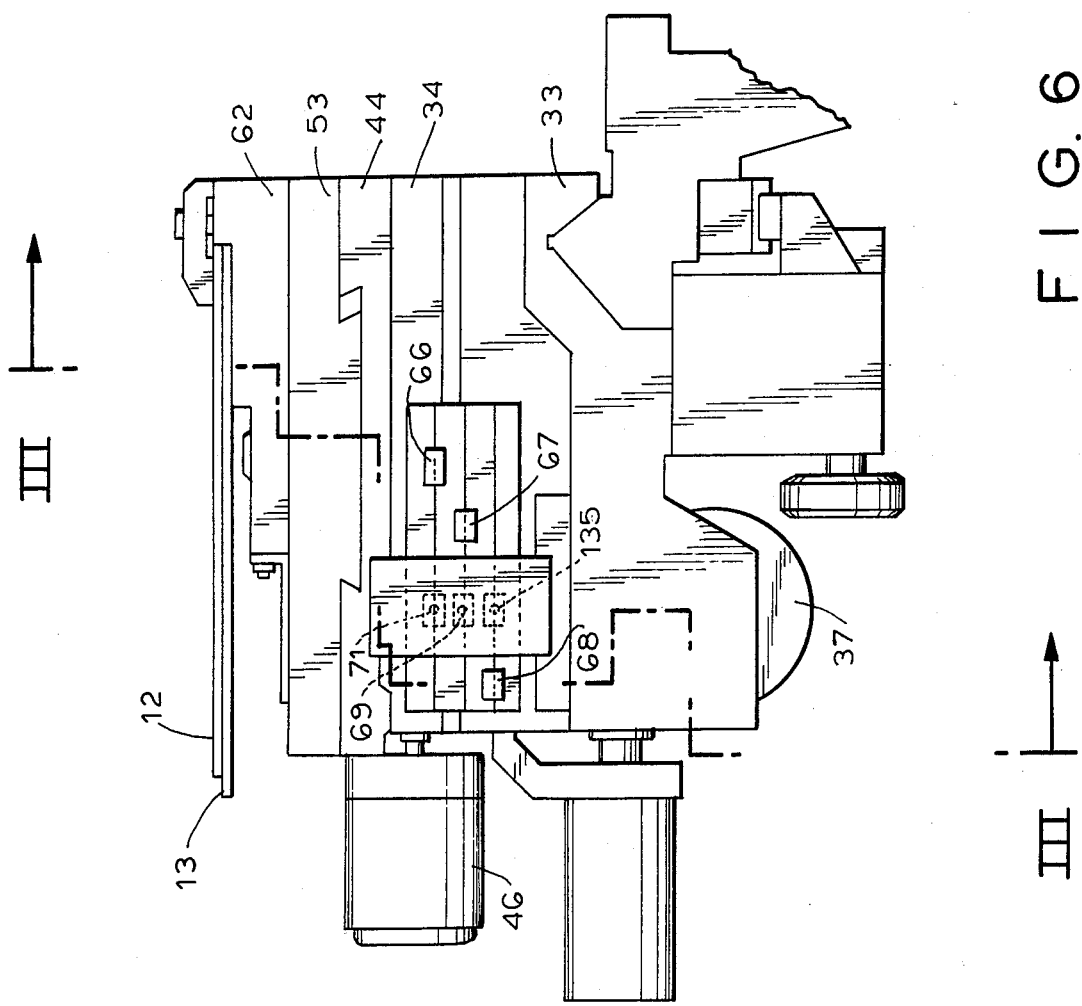
FIG. 6 is a side view of assembly 11 where the templates are mounted.
Figure 7:
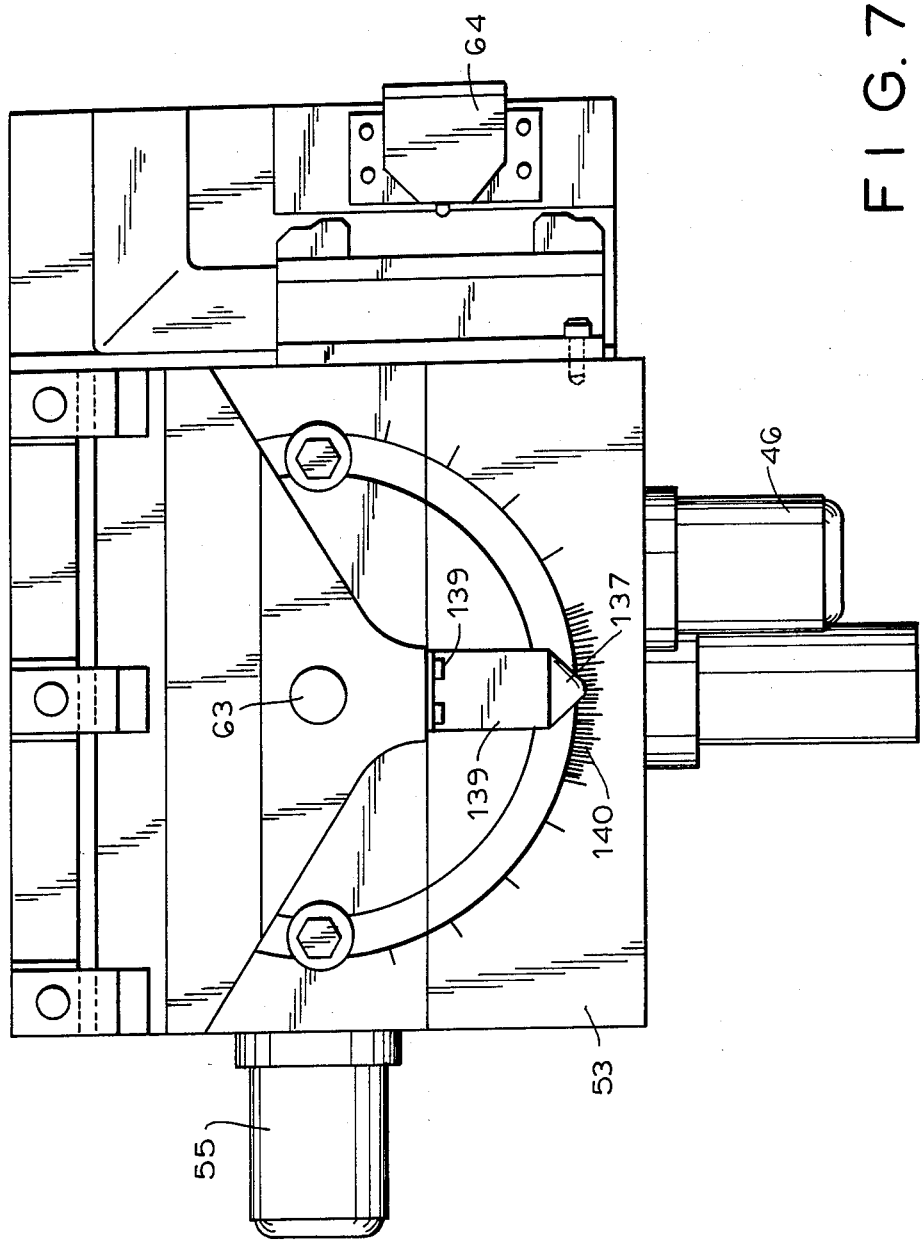
FIG. 7 is a top view of assembly 11 where the templates are mounted.
Figure 8:
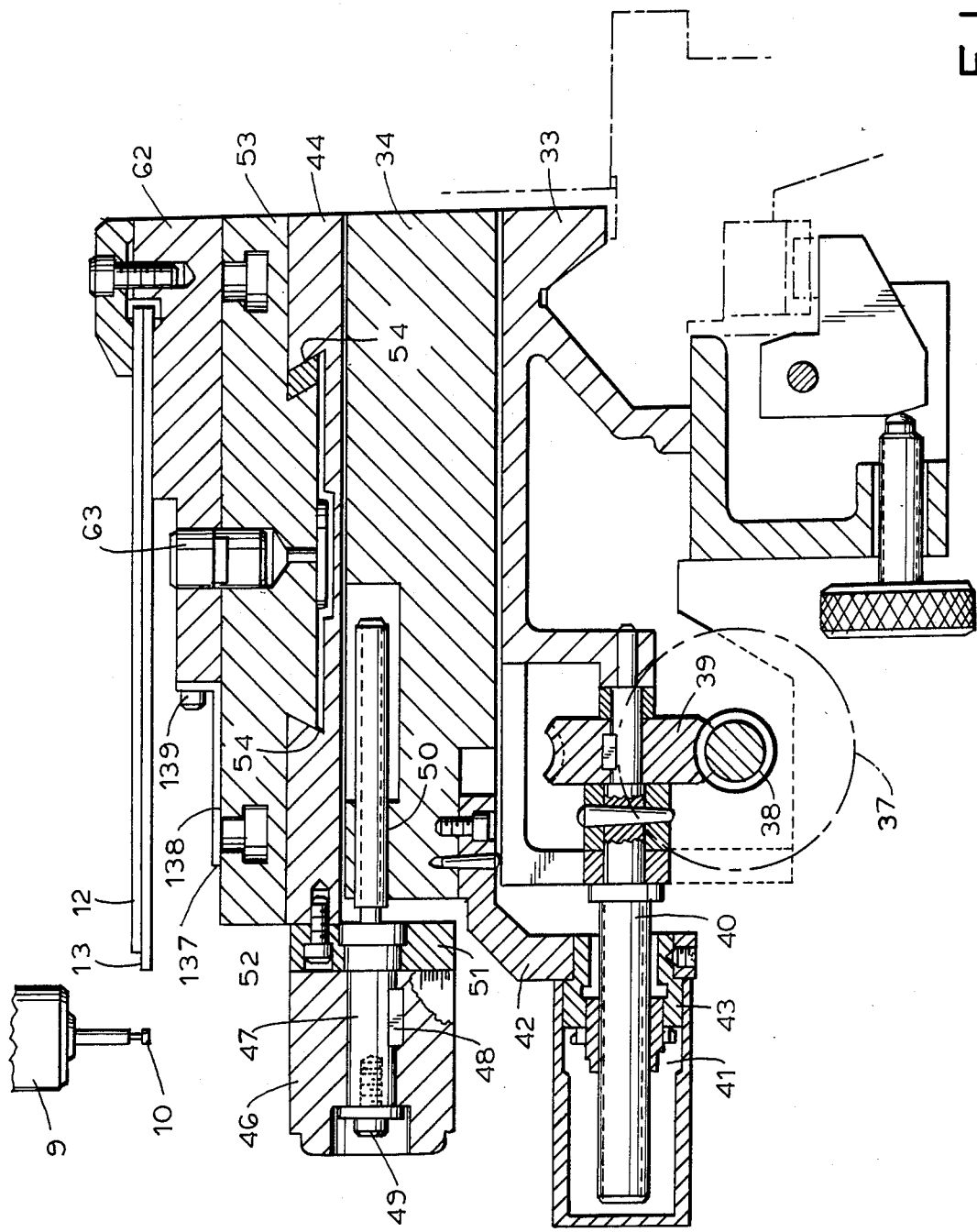
FIG. 8 is a cross section of assembly 11 according to section II—II, showing mounted templates.
Figure 9:
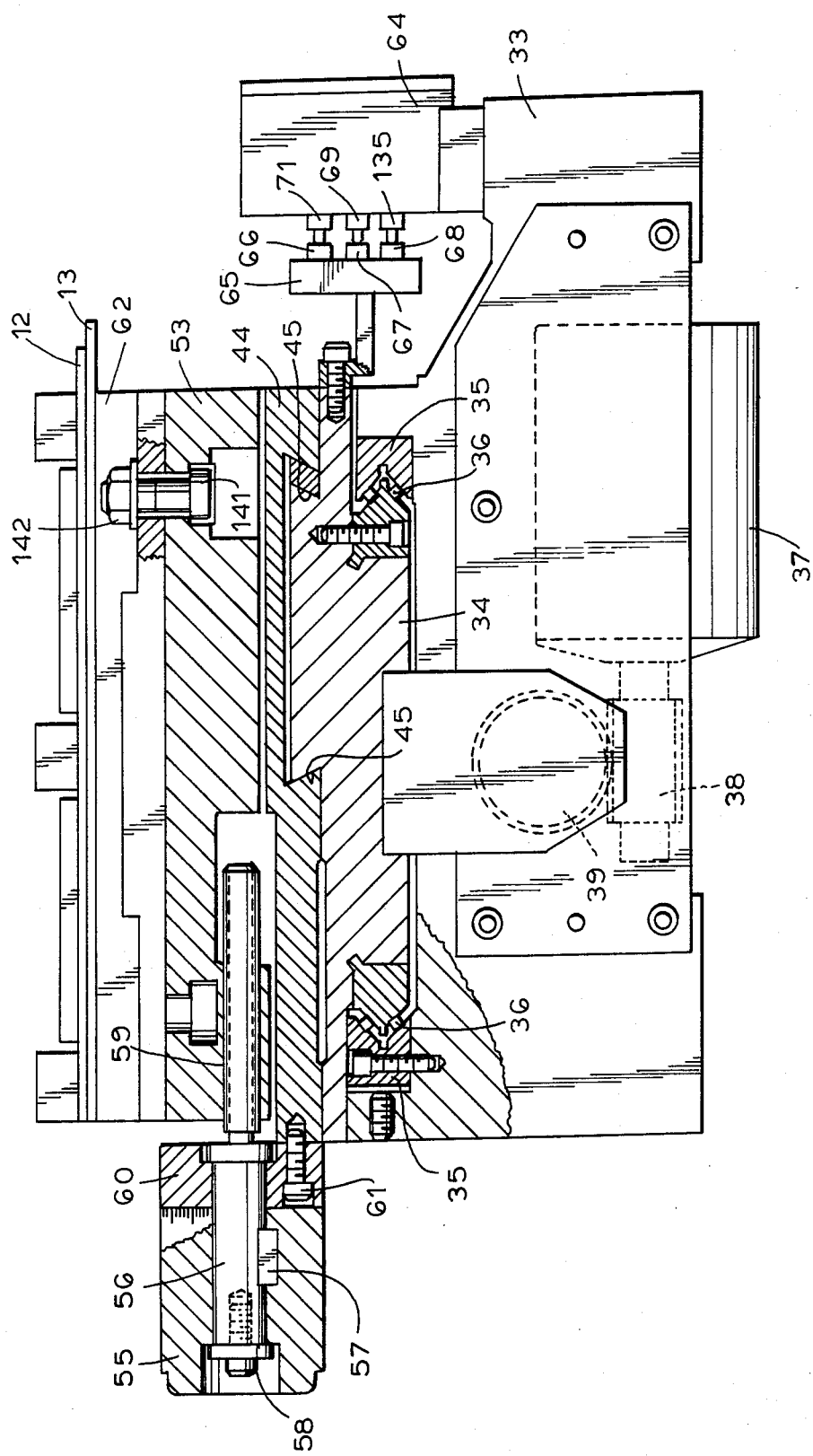
FIG. 9 is a longitudinal section of assembly 11 according to section III—III, showing mounted templates.

As illustrated in FIGS. 1, 7, 8 and 9, assembly 11 where templates 12 and 13 are mounted, consists of support 33 guided on the main guideways of the lathe which enables to be positioned and clamped on this guideway in any desired position along the whole useful bed length; support 34 slidable over guideways 35 existing on support 33 which guideways are at right angle to the bed prism and which contact surfaces can be of metal to metal or provided with anti friction linear bearings 36 as illustrated in FIG. 9, being the displacement of referred support 34 servo assisted through electric motor 37 mounted on support 33, which motor when running transmits rotation through worm 38 and worm wheel 39 to screw 40 which is coupled to nut 41 which at its turn is mounted on arm 42 through bushing 43, and arm 42 mounted on support 34, this last one displaces in respect to support 33 each time rotation is transmitted from motor 37; support 44 rested, guided and slidable over guideways 45 existing on top of support 34, which guideways are arranged parallel to the displacement of this support being the micrometric displacement of support 44 on top of support 34 made when knob with dial 46 is manually rotated, which is mounted on screw 47 through key 48 and screw 49 being that when the referred knob 46 is rotated screw 47 is also rotated, being a portion of this screw coupled to an internal thread 50 existing in the body of support 34 and another portion supported by bearing 51 which is mounted on support 44 through screws 52, promoting micrometric displacement of support 44 over support 34; support 53 rested, guided and slidable on guideways 54 existing on top of support 44 which guideways are at right angle to the displacement of this support, being the micrometric displacement of support 53 over support 44 made by operating knob with dial 55 which is mounted on screw 56 through key 57 and screw 58, when the referred knob 55 is rotated screw 56 is also rotated, being a portion of this screw coupled to thread 59 existing in the body of support 53 and another portion rested on bearing 60 which, in turn, is mounted on support 44 through screws 61, promoting micrometric displacement of support 53 over support 44, which displacement is on right angle to the displacement of support 44; a seivel support 62 on which are located and mounted templates 12 and 13, mounted on support 53, and pivoted on pin 63, which support once positioned using as reference not only the pointed end 137 existing at the end of indicator 138 which is mounted on the same through screws 139, but also by the angular graduation 140 stamped on the top face of support 53 on which it is mounted the referred support 62 through screws 141 and nuts 142; the box 64 of travel limit microswitches housing a set of micro switches 69, 71 and 135 mounted on support 33 and a support 65 provided with adjustable dogs 66, 67 and 68 mounted on support 34. Micrometric displacement at right angle to supports 44 and 53 and angular displacement of support 62, are used for positioning the templates when setting up the machine and to make corrections which may be necessary to compensate for tool wear or repositioning when replacing tools. The servo assisted displacement of support 34 is used during the work cycle to make automatic increment of cut between each pass of the cycle and corresponding to the depth of cut that must be made by the tool on the next pass, and the travel limit switch 69 when actuated pre-arranges the electric system to stop the machine at the end of the automatic copying cycle which occurs when the travel limit microswitch 70 (see FIGS. 2 and 14) and the travel limit switch 71 are actuated (see FIGS. 5 and 6) they pre-arrange the electric system to stop the machine at the end of the thread cutting cycle which occurs when the travel limit microswitch 70 is actuated.

Figure 10:
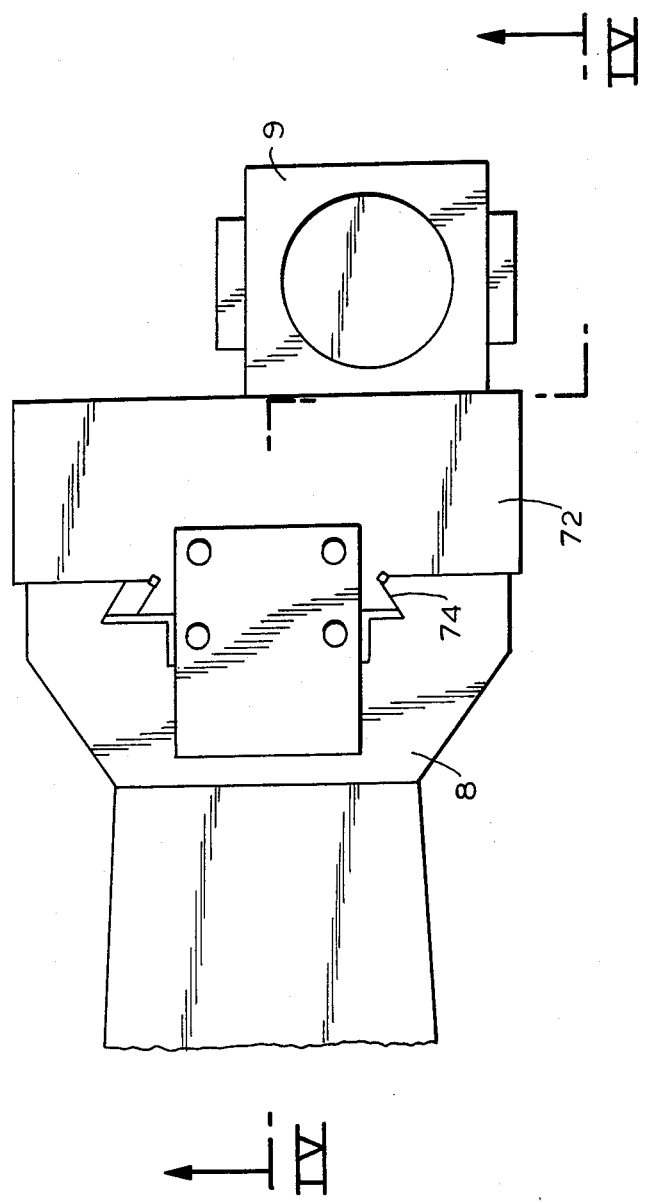
FIG. 10 is a partial top view of the arm end that supports the copying valve head.
Figure 11:
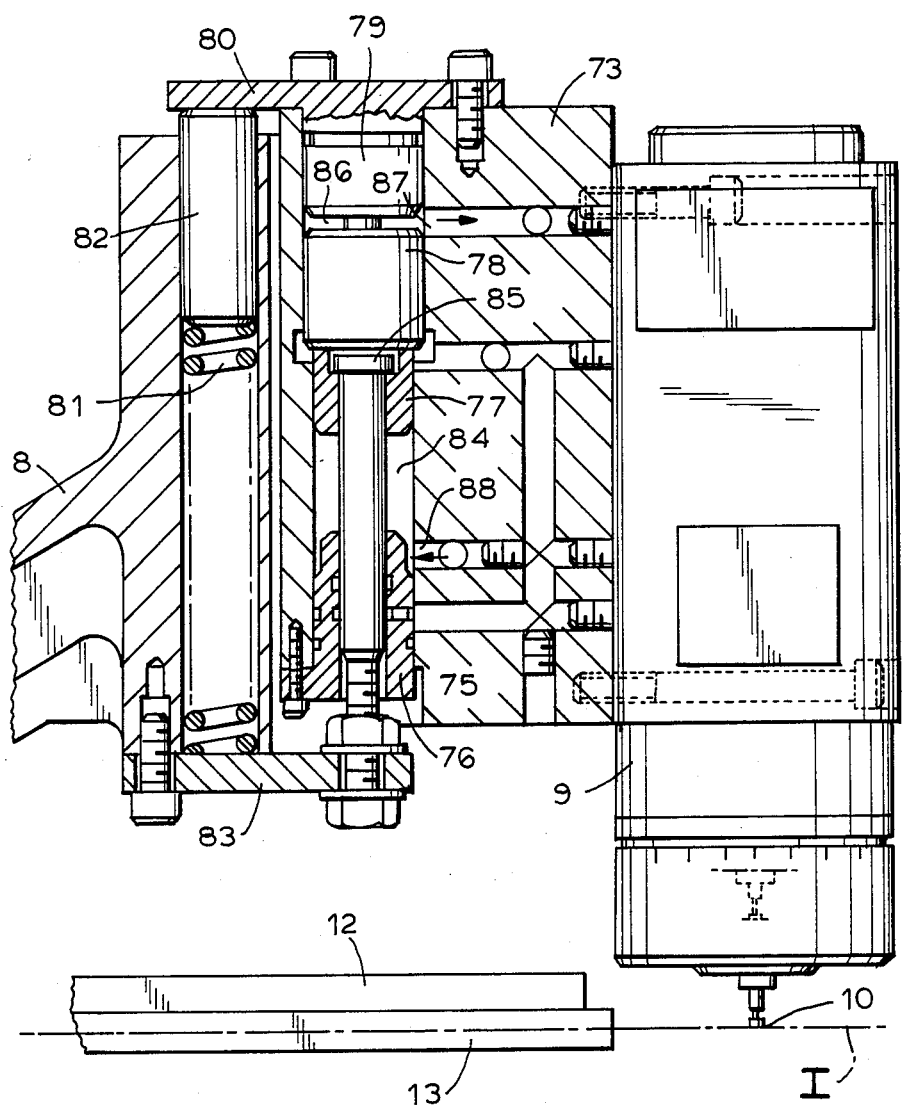
FIG. 11 is a longitudinal view according to section IV—IV and through the arm end that supports the copying valve, illustrating this valve and its respective stylus in its lower position.
Figure 12:
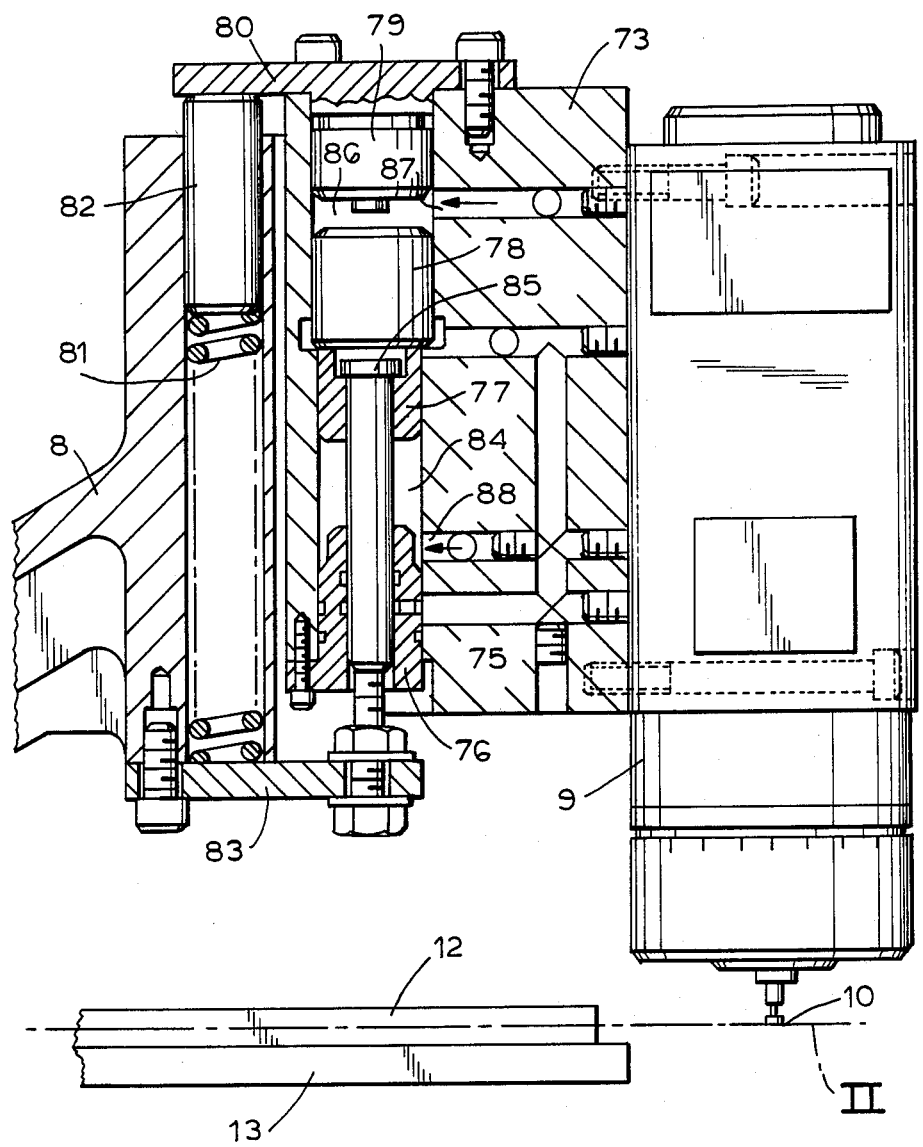
FIG. 12 is a longitudinal view according to section IV—IV and through the arm end that supports the copying valve, illustrating this valve and its respective stylus in its intermediate position.
Figure 13:
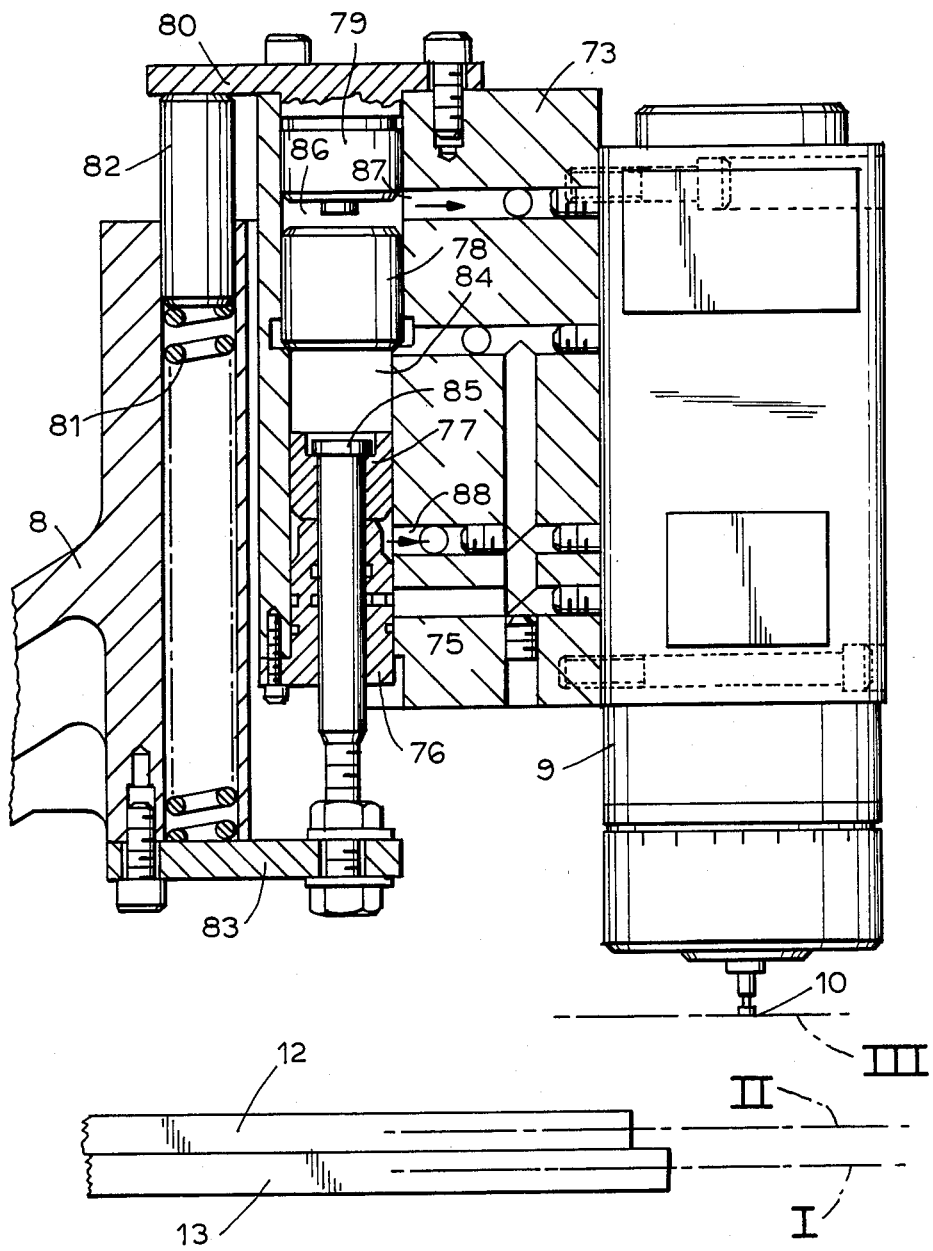
FIG. 13 is a longitudinal view according to section IV—IV and through the arm end that supports the copying valve, illustrating this valve and its stylus in its top position.

At the end of the referred arm 8, head 72 (see FIG. 10) is located and its function is to support copying valve 9 and to permit the vertical positioning of referred copying valve 9 in three different position, that is, in the lower position (position I of FIG. 11) stylus 10 remains positioned to explore template 13, in the intermediate position (position II of FIG. 12) the stylus remains positioned to explore template 12, and the top position (position III of FIG. 13) is the safety or rest position. The above mentioned head 72 consists of a body 73 (see FIGS. 11, 12 and 13) guided and slidable on guideways 74 existing on arm 8 and having said body 73 in its interior a hole in the shape of a chamber or hydraulic cylinder with two different diameters where are located connecting rod 75, cover 76, piston bushing 77, piston 78 and top cover 79 with extension 80 incorporated on its top. In a hole existing at the end of arm 8 are located spring 81 and pin 82 and in the lower part of this arm it is mounted connecting element 83 on which end is mounted the already mentioned connecting rod 75. The positioning of head 72 is accomplished by hydraulic means as follows: when pressured oil enters cylinder chamber 84 (FIG. 11) oil reaction at the lower face of piston -bushing 77 which is in contact with head 85 of connecting rod 75 acts on the top face of cover 76 which is mounted on body 73 forcing said body to remain in its lower position, position I of stylus 10, being the oil in cylinder chamber 86 on free discharge through hole 87. On the other hand, putting pressured oil in chamber 86 (FIG. 12) and letting pressured oil in chamber 84, the pressured oil reacts on the top face of piston 78 and an action on the lower face of top cover 79 mounted through extension 80 on body 73, forcing said body to move upward due to the difference of area in the two chambers, taking its intermediary position, that is, position II of stylus 10, according to FIG. 12. Without supplying oil to chambers 84 and 86, that is, letting the oil in these chambers to drain freely through holes 88 and 87, respectively (FIG. 13), action of spring 81 on pin 82 which, in turn, acts on extension 80, forces body 73 to move upward until it reaches its safety or rest position, positioning stylus 10 on position III. This position is also called safety position because in the event of a failure in the hydraulic system (lack of oil) it assures the instantaneous operation of spring 81 which acts on pin 82 and displaces support 73 upward, thus avoiding possible collisions that would cause damage to copying valve 9 and stylus 10.

Since the copying carriage 4 is rested, guided and slidable over the ways arranged on the top face of the lower swivel support 3, said carriage may be displaced on cross or inclined movement in respect to the main spindle geometric axis, independent of the cross movement of cross support 2 which travels on guideways arranged on the top face of longitudinal carriage 1.

Figure 14:
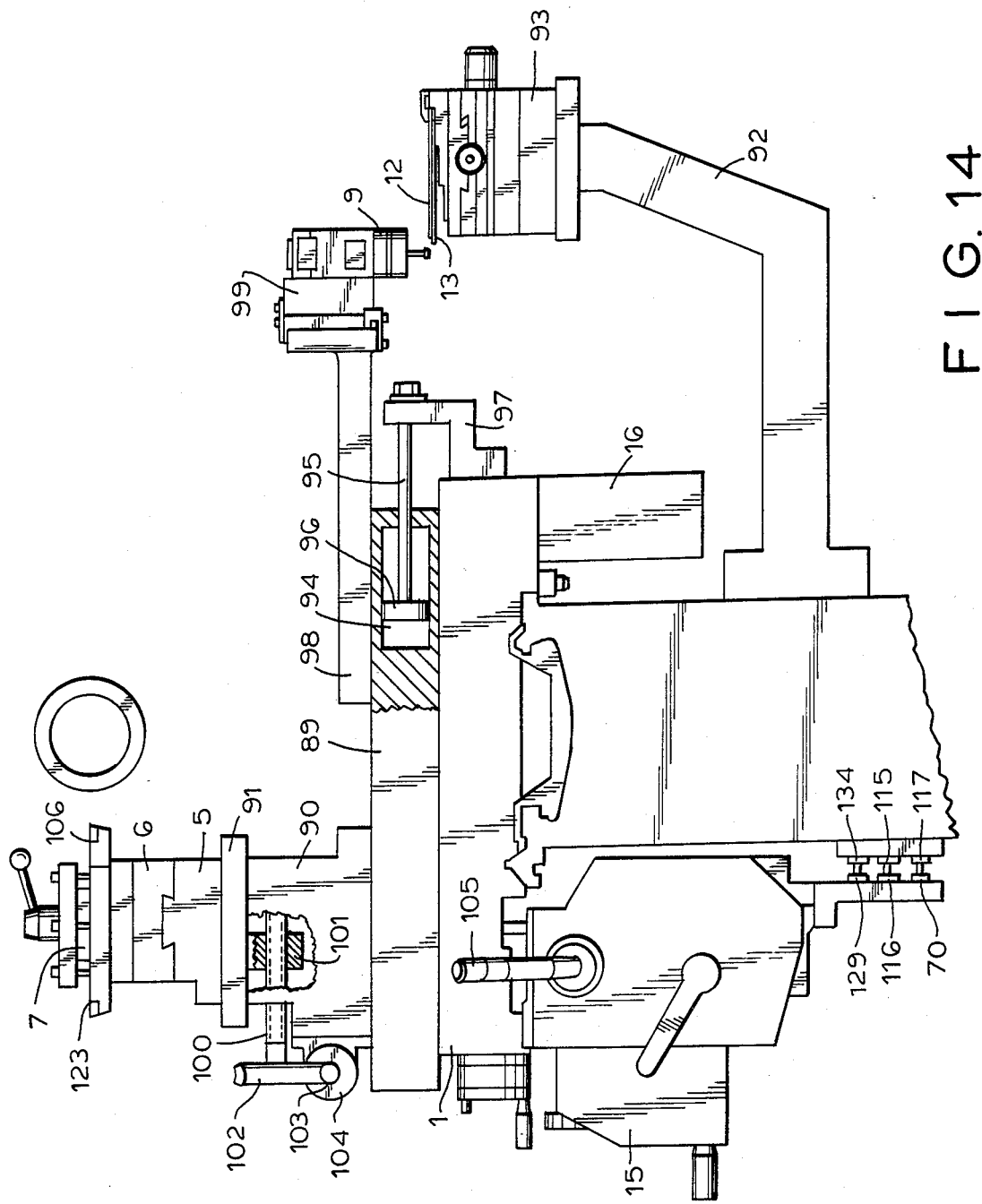
FIG. 14 is a side view of the longitudinal carriage with all supports mounted on it, the support arm for the copying valve and the template supports, illustrating a possible alternative for positioning these elements.

As an alternative, cross support 2 can be changed into copying carriage, as illustrated in FIG. 14, and copying carriage 4 into a support servo assisted by the automatic system of mechanical feed of depth of cut in incremental pre-programmed manner through electric means. In this case, the device has the following configuration: a longitudinal carriage 1 on which are cross support 89, lower swivel support 90, servo assisted support 91, top swivel support 5, longitudinal support 6 and tool support 7; a support 92 mounted on the bed with the function of supporting assembly 93 where templates 12 and 13 are mounted. On cross support 89 it is mounted or incorporated hydraulic copying cylinder 94 which rod 95 of piston 96 is attached to arm 97 which, in turn, is mounted on the body of longitudinal carriage 1. Still on cross support 89, arm 98 is mounted in which end is the head 99, copying valve support 9. The servo assisted support 91 is rested, guided and slidable on guideways existing on the top face of the lower swivel support 90, being the displacement of the referred support 91 operated through screw 100, nut 101, worm wheel 102 and worm 103, through motor 104 which is mounted on the lower swivel support 90. The function of servo assisted support 91 is, when displaced on the lower swivel support 90, to perform the automatic increment of depth of cut between each pass of the copying and threading cycles.

Figure 3:
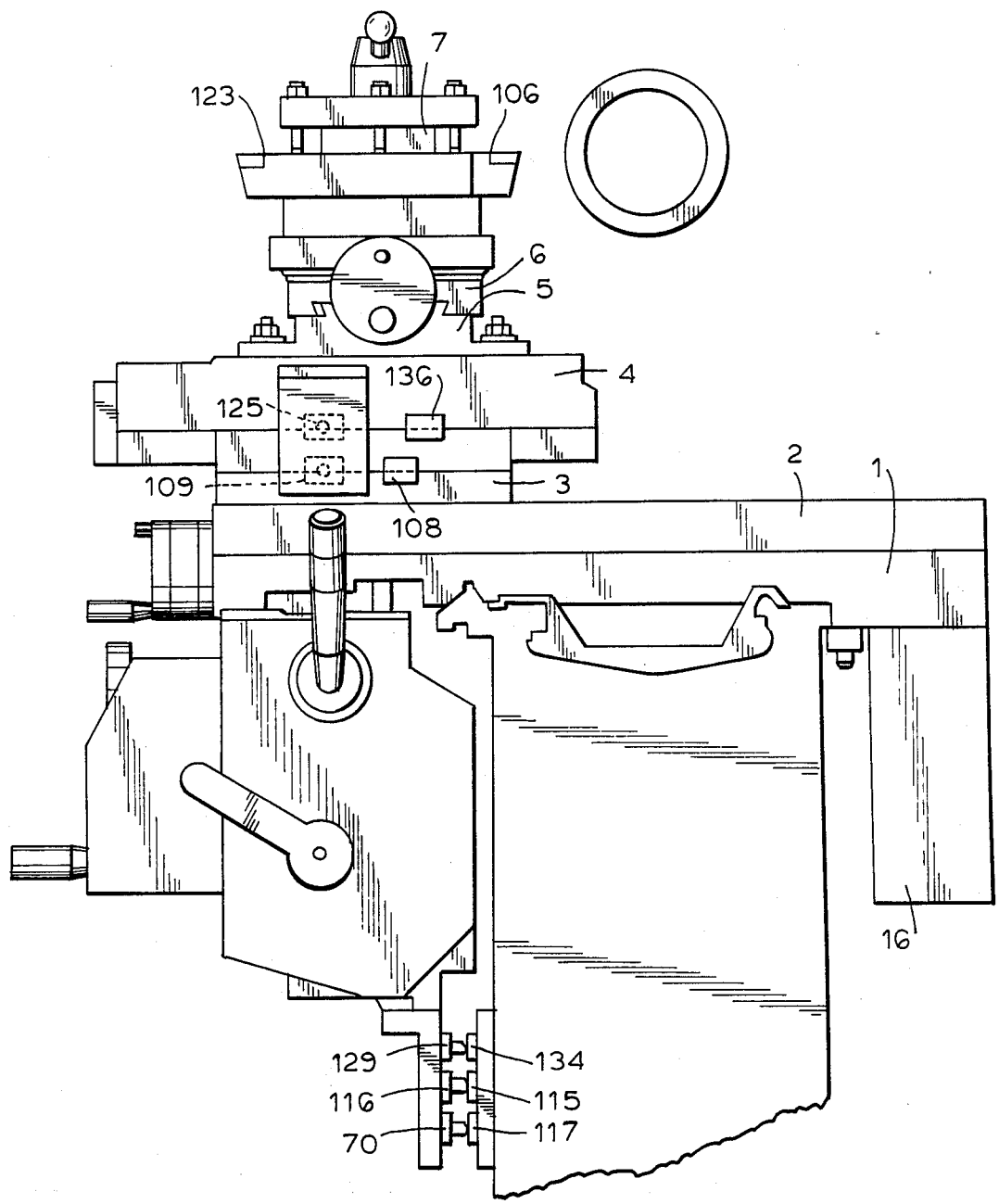
FIG. 3 is a side view of the longitudinal carriage with all supports mounted on it.
Figure 4:
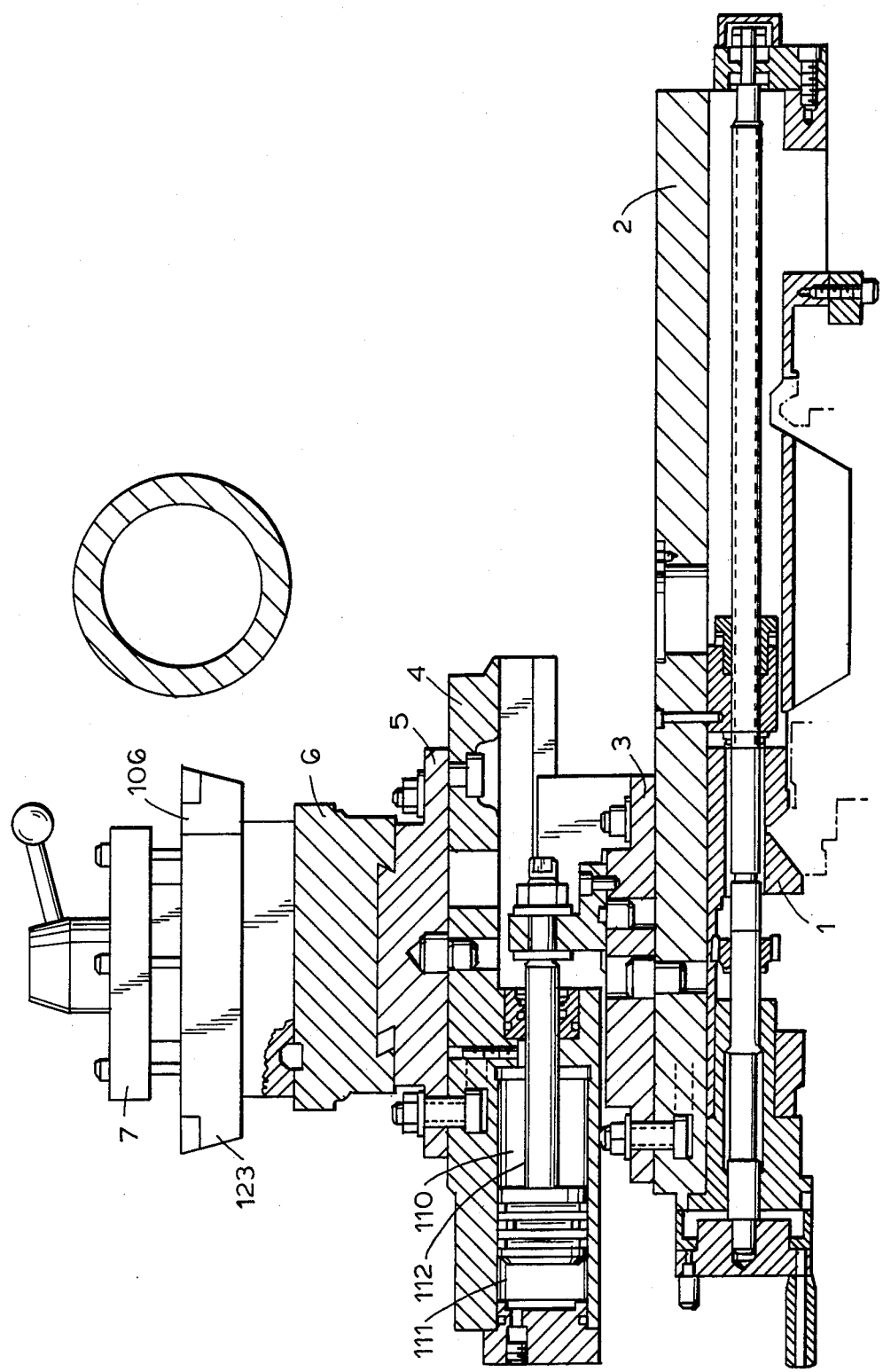
FIG. 4 is a cross section of the longitudinal carriage according to section I—I.
Figure 15:
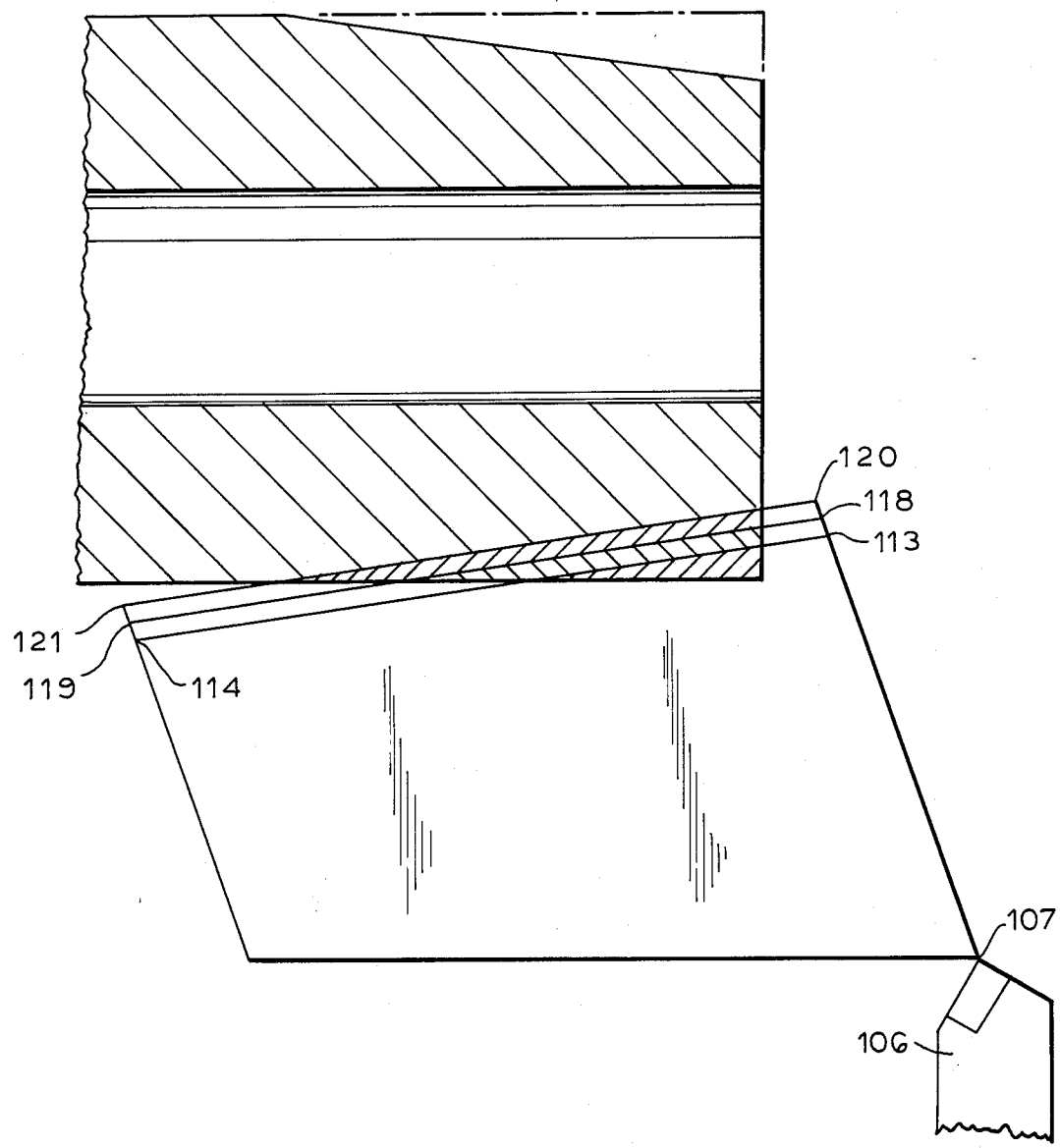
FIG. 15 is a sketch of the path followed by the tool for the automatic square cycle for copying.

After describing the constructive elements that comprise the present invention, a complete work cycle will be now explained step by step. Considering that power is supplied to the main electric panel of the lathe to the programming panel 14 and to the control panel 15, and that the hydraulic unit pump is in operation, that the travel limit microswitches are duly positioned for the desired work length travel, that the work cycle is already programmed on the programming panel 14, that the electric selecting switch 31 is in "copying" position and that feed lever 105 of longitudinal carriage 1 is in the "engaged" position so that when main spindle is rotating the longitudinal carriage start moving to work position, the cycle for copying will be accomplished as follows: by pressing starting electric button 32, the lathe main spindle starts rotating and simultaneously the copying carriage 4 starts its cross or inclined rapid movement from a starting or resting point (FIG. 15) having as reference the tool edge 106 in position 107 moving said copying carriage 4 on rapid traverse towards the workpiece, driven by the oil that enters the hydraulic cylinder chamber of copying carriage 4 until the travel limit microswitch 109 (FIG. 3) is actuated which in turn actuates a solenoid not shown in the drawings, which acting on hydraulic copying valve 9 changes rapid traverse of copying carriage 4 into slow working travel, said copying carriage 4 continues advancing until stylus 10 of copying valve 9 touches the profile of template 12. When stylus 10 is in position II (FIG. 12) and touches the profile of template 12, the copying valve 9 takes a position that it starts to distribute oil into the two chambers 110 and 111 of hydraulic cylinder (FIG. 4) in quantity and under pressure that are proportional to the areas resulting from the cylinder and piston 112 of same cylinder so that it maintains the system in equilibrium and stops the cross or inclined movement of copying carriage 4 at the beginning of the cut, that is, when the edge of tool 106 has reached position 113 (FIG. 15).

Simultaneous to the above described movement, longitudinal carriage 1 moves on slow work travel and in conjunction with the cross or inclined movements of copying carriage 4 and of longitudinal carriage 1, the edge of tool 106 withdrawing from the starting or resting point 107 travels up to the point of starting the cut 113. At this point as mentioned before, cross or inclined movement of copying carriage 4 is interrupted by the contact of stylus 10 on template 12 profile. Longitudinal carriage 1 continues advancing performing the required travel for machining the workpiece. During the longitudinal carriage travel, stylus 10 explores the profile of template 12 actuating the piston of copying valve 9, which controls oil flow to chambers 110 and 111 of the hydraulic cylinder, performing the cross or inclined movement of copying carriage 4 and consequently of the tool post 7. The cross or inclined movement of copying carriage 4 follows the shape of template 12 profile and causes the tool 106 to reproduce on the workpiece the same profile. When longitudinal carriage 1 reaches the final machining distance which corresponds to the tool edge at point 114 (FIG. 15), a travel limit microswitch 129 (FIG. 2 and 3) is actuated by dog 134, which energizes simultaneously: a solenoid not shown in the figures which actuates a copying valve which in turn controls the return of copying carriage 4 at rapid cross or inclined movement on opposite direction, withdrawing from workpiece, the inversion of feed direction of longitudinal carriage 1 at rapid traverse, moving said longitudinal carriage from final point 114 of the machining travel towards the starting or resting point 107; the starting of electric motor 37 through an electric switch not visible in the figures which motor upon being started transmits rotating movement to screw 40 through worm 38 and worm wheel 39 and when this screw is rotating a displacement of support 34 of the templates on base 33 takes place. Said electric switch starts motor 37 is controlled by an electric programming system in the copying cycle which consists of selecting switches 17, 18 and 19 and of time relays 20, 21 and 22 being that during each pass each relay determines the duration of time that said electric switch must remain energized in order that in the event direct current is connected to the motor, it is injected at controlled intensity in the motor and for a time determined by each of the mentioned time relays so that screw 40 turns only a fraction of a turn and imposes a limited displacement to the template support as previously adjusted. Selecting switches 17, 18 and 19 determine the number of passes on which each time relay must operate so that said relays being adjusted to operate at different times from each other it is possible to change the depth of cut as many times as there are relays in the system.

With the displacement of the template as described, when stylus 10 touches again the profile of template 12 the copying carriage 4 will assume a new position and consequently cutting tool 106 will be deeper on the workpiece, this displacement is called cut increment and corresponds to the depth of cut of the next pass.

When longitudinal carriage 1 and copying carriage 4 arrive back to the starting point, that is, the edge of tool 106 at point 107, the travel limit microswitch 70 is actuated by dog 117 controlling simultaneously the following operations:

the starting of copying carriage 4 movement in the direction of the workpiece to be machined.

the starting of longitudinal carriage 1 movement in the direction of the workpiece to be machined.

Starting movement of the copying carriage 4 and the longitudinal carriage 1 for the second pass, the edge of tool 106 travels the path from 107 to 118, from 118 to 119 and from 119 to 107. These movements are successively repeated until copying carriage 4 reaches point 120 programmed as being the last pass and at this point a travel limit microswitch 69 (FIG. 5 and 6) is actuated which pre-arranges the electric system to stop the machine when the edge of the tool has travelled the path from 120 to 121 and from 121 to 107. The referred stop of the machine at point 107 occurs when the travel limit microswitch 70 touches dog 117.

When the copying cycle terminates, the program must be prepared for the thread cutting cycle for which the following is necessary:

to turn selecting electric switch 31 to "threading" position. This selecting switch pre-arranges electric controls, switches, relays, travel limit microswitches, etc., for the thread cutting cycle and actuates an electrovalve not visible in the drawings, which through hydraulic means positions head 72 in the lower position to enable that stylus 10 takes the position I of FIG. 11 and during the cycle it explores template 13;

to position the longitudinal carriage 1 feed lever 105 at neutral position;

to position leadscrew half nuts engaging lever 122 in the "engaged" position;

to position levers of the feed and thread box not visible in the drawings in accordance with the thread pitch desired;

to index the square tool post 7 to have thread cutting tool 123 in working position.

Figure 16:
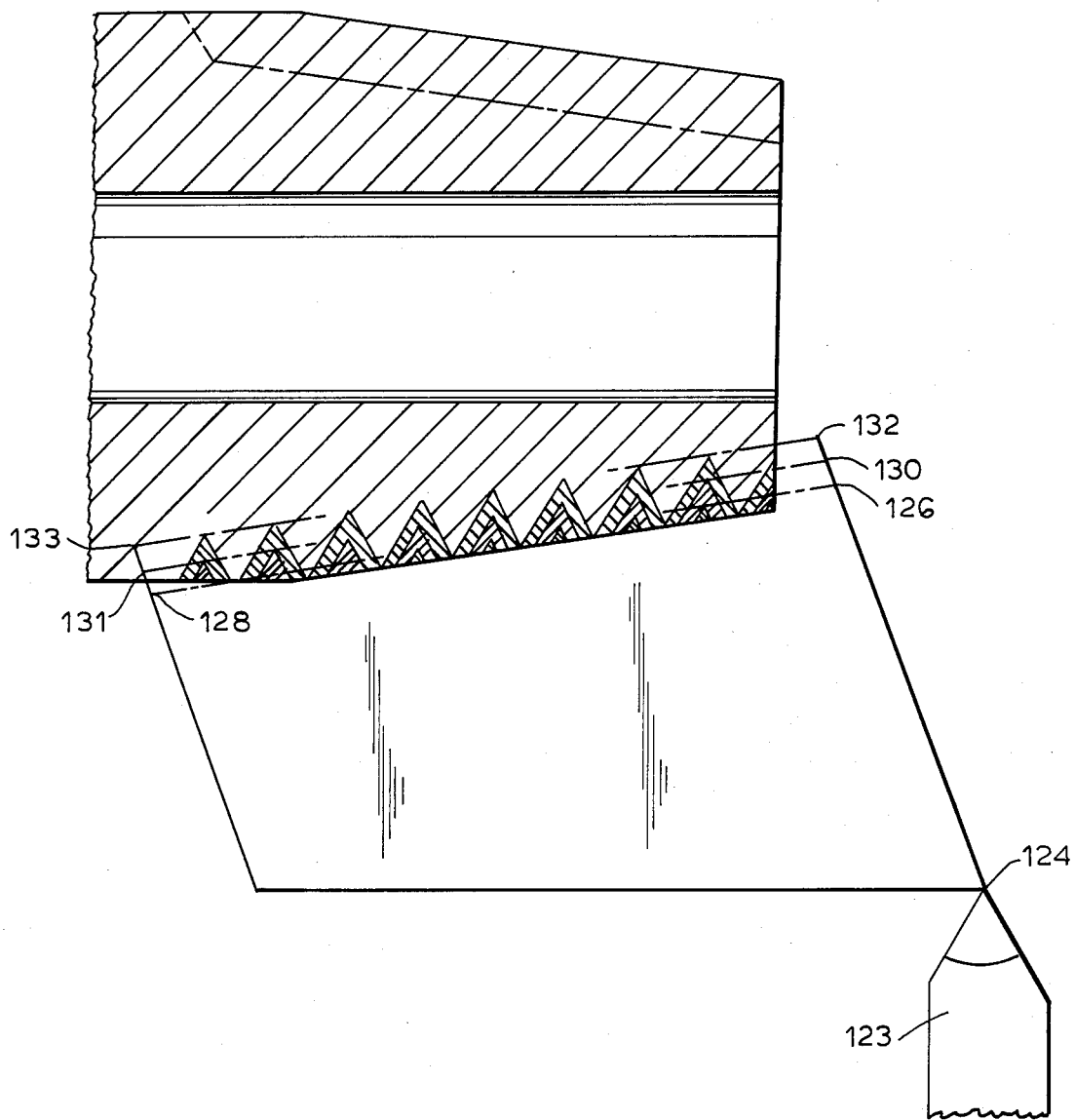
FIG. 16 is a sketch of the path followed by the tool for the automatic square cycle for thread cutting.

After this preparation, the lathe is in condition to start the automatic square cycle for threading which is accomplished in the following manner: pressing electric starting button 32 the main spindle starts rotating and simultaneously the copying carriage 4 starts its cross or inclined movement starting from the resting or starting point having as reference the edge of tool 123 in position 124, moving said copying carriage 4 at rapid traverse towards the workpiece driven by the oil that enters chamber 110 of the support hydraulic cylinder until dog 136 (FIG. 3) actuates the travel limit microswitch 125, which actuates a solenoid not shown in the figures, which acting on copying valve 9 changes the rapid travel of copying carriage 4 into slow working travel, said copying carriage 4 continues advancing until stylus 10 of copying valve 9 touches the profile of template 13. When the stylus touches the profile of template 13, the copying valve 9 assumes a position that it starts distributing oil to the two chambers 110 and 111 of the hydraulic cylinder in quantity and under pressure that are proportional to the resulting areas of the cylinder and piston 112 of this same cylinder in order to keep the system in equilibrium and to stop the cross or inclined movement of copying carriage 4 at the cutting initial point, that is, when the edge of tool 123 has reached position 126 as illustrated in FIG. 16.

Simultaneous to the above described movement, longitudinal carriage 1 moves driven by leadscrew 127 and in conjunction with cross or inclined movements of the copying carriage 4 and longitudinal carriage 1 the edge of tool 123 starting from the resting or starting point 124 goes up to the cutting initial point 126. At this point the cross or inclined movement of copying carriage 4 is interrupted by contact of stylus 10 on the profile of template 13. Longitudinal carriage 1 continues advancing performing the travel required for machining the workpiece. During this travel of the longitudinal carriage, stylus 10 explores the profile of template 13 which profile can be parallel in the case of machining cylindrical threads or inclined in the case of machining taper threads, and with its movement it actuates the piston of copying valve 9 which controls the oil flow to chambers 110 and 111 of the hydraulic cylinder, maintaining copying carriage 4 stationary in the case of machining cylindrical threads and, consequently, either maintains stationary or moves with itself the tool post 7. In the case of taper threads, the cross or inclined movement of copying carriage 4 follows the shape of the profile of template 13 and causes tool 123 to make a taper thread on the workpiece in accordance with the angle of the template. When longitudinal carriage 1 arrives at the final point of the machining travel with the tool edge at point 128, an electric travel limit microswitch 116 is actuated after touching dog 115 (FIGS. 2 and 3) which energizes a solenoid not visible in the figures which controls simultaneously copying valve 9 for the return of copying carriage 4 which performs rapid cross or inclined movement to opposite direction withdrawing from the workpiece; the inversion of travel direction of longitudinal carriage 1 moving the longitudinal carriage from the final point of machining travel towards the resting or starting point; the actuating of an electric switch, not visible in the figures, which starts motor 37 being that this motor, like the one already described for the copying cycle, performs the displacement of template support 34 on base 33. Being said electric switch now controlled by selecting switches 23, 24, 25 and 26 and by time relays 27, 28, 29 and 30, which control the template displacement as already described for the copying cycle, being that this displacement determines the depth of cut that the tool must machine on the next pass. When longitudinal carriage 1 and copying carriage 4 arrive at the starting point 124, that is, the edge of the tool at point 124, the electric travel limit microswitch 70 is actuated by dog 117, which controls simultaneously the following movements:

the starting of copying carriage 4 movement in the direction of the workpiece to be machined;

the starting of longitudinal carriage 1 movement in the direction of the workpiece to be machined.

By starting copying carriage 4 and longitudinal carriage 1 for the second pass, the edge of tool 123 performs the path from 124 to 130, from 130 to 131 and from 131 to 124. These movements are successively repeated until the copying carriage reaches point 132 programmed as being the last pass and, at this point, an electric travel limit microswitch 71 (see FIGS. 5 and 6) is actuated which prearranges the electric system for stopping the machine when the edge of tool 123 has reached point 124.

The longitudinal carriage 1 and the copying carriage 4 continue moving until the edge of the tool terminates the last cutting pass, point 133, and at this point actuated by dog 134 and electric travel limit microswitch 129 control simultaneously: a solenoid not shown in the figures which controls copying valve 9 for the return of copying carriage 4 at rapid cross or inclined traverse in opposite direction withdrawing from the workpiece; the inversion of direction of feed of longitudinal carriage 1 at rapid traverse moving said longitudinal carriage from final point 133 of the machining travel towards the starting or resting point 124; the operation of motor 37 at high speed and at rotation contrary to the one during the working cycle causing the return of support 34 to the initial position, that is, to the position where dog 68 (see FIGS. 5 and 6) actuates the travel limit microswitch 135.

Figure 17:
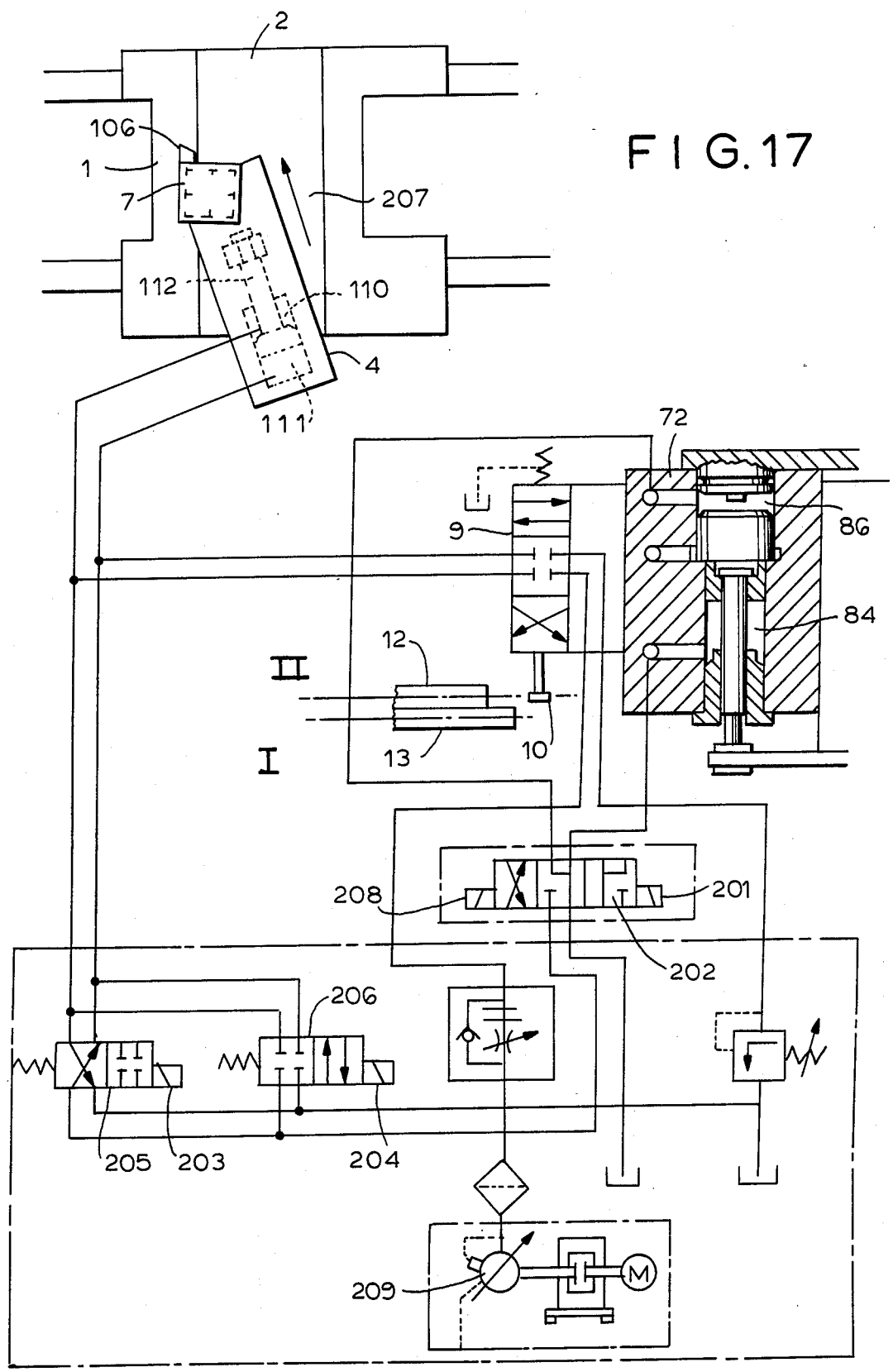
FIG. 17 is a view showing a hydraulic system used in the device.

FIG. 17 illustrates the hydraulic system used in this device. Copying carriage 4 is in its resting position, that is, in a position that tool 106 is at point 107 (FIG. 15). For better understanding of the hydraulic system as well as of the rapid traverse, slow movement and copying travel of copying carriage 4, the sequence of a pass of the copy turning cycle is described below.

Figure 2:
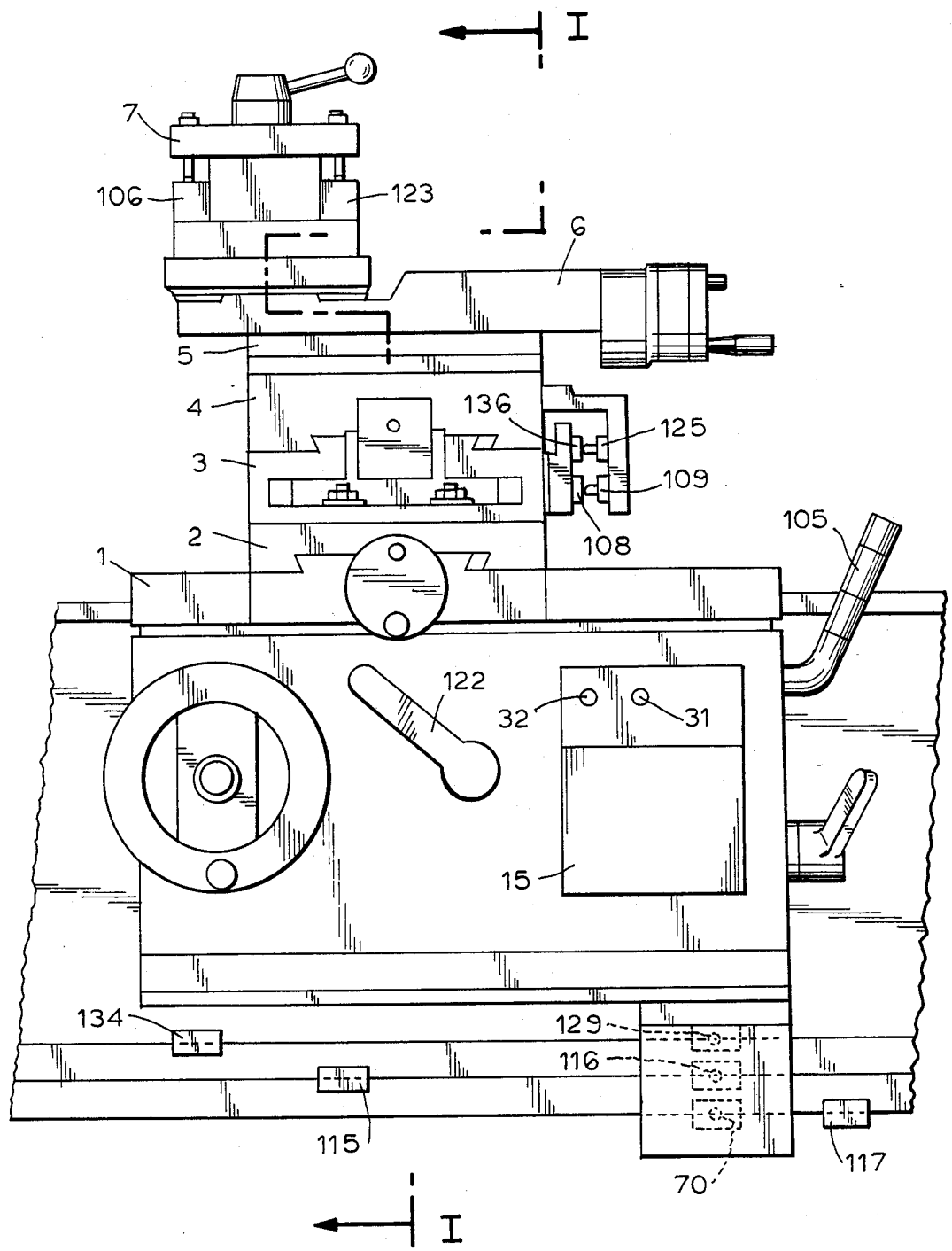
FIG. 2 is a front view of the longitudinal carriage with all supports mounted on it.

Supposing that electric current line is connected to main electric panel 211 (FIG. 18), to programming panel 14 and to control panel 15, and that hydraulic unit pump 209 (FIG. 17) is in operation, that the limit switches are duly set for the desired work travel, that the work cycle is programmed on programming panel 14, and also that lever 105 that engages longitudinal feed to carriage 1, is in the engaged position to provide feed to said carriage 1 through the feed rod (not marked in FIG. 1).

On the above assumption by positioning selector switch 31 on panel 15 in the "copy" position solenoid 201 is energized. The solenoid actuates electrovalve 202 which permits oil to flow under pressure from pump 209 to chambers 84 and 86 for positioning needle 10 of copying valve 9 in position II, that is, on the same plane of template 12.

Pressing starting pushbutton 32 on panel 15, solenoids 203 and 204 are energized. Solenoid 203 actuates electrovalve 205 which prevents the oil to flow to chamber 111 of the hydraulic cylinder, and solenoid 204 actuates electrovalve 206 which allows the oil to flow to chamber 110 of the hydraulic cylinder and lets the oil to discharge from chamber 111 thus causing copying carriage 4 to move in rapid traverse towards the workpiece as indicated by arrow 207. When the edge of tool 106 is close to the workpiece, limit switch 109 (FIGS. 3 and 18) is actuated, which through electric panel 211 deenergizes solenoid 204 which actuates electrovalve 206 which interrupts the oil that was flowing to chamber 110 of the hydraulic cylinder and that was causing copying carriage 4 to move in rapid traverse. Chamber 110 of the hydraulic cylinder receives now through copying valve 9 a reduced quantity of oil, while the oil of chamber 111 flows to the reservoir through said copying valve 9, and copying carriage 4 continues to advance towards the workpiece with slow movement. When stylus 10 touches the profile of template 12, the piston of copying valve 9 assumes a position that it distributes oil to both chambers 110 and 111 of the hydraulic cylinder in quantity and pressure proportional to the area of the hydraulic cylinder and its piston 112 to maintain the system in balance and to stop inclined movement of copying carriage 4 at the beginning of cutting that is, when edge of tool 106 has reached position 113 (FIG. 15), which position results from the simultaneous movement of copying carriage 4 and longitudinal carriage 1 being this longitudinal carriage actuated by a feed rod (not marked in FIG. 1) and continuing said longitudinal carriage 1 with feed motion until its reaches point 114. During the travel of longitudinal carriage, stylus 10 explores the profile of template 12 and actuates the piston of copying valve 9 which controls oil flow to chambers 110 and 111 of the hydraulic cylinder, performing the inclined movement of copying carriage 4, and, consequently, movement of tool post 7. The inclined movement of copying carriage 4 follows the profile of template 12 and causes tool 106 to reproduce the same profile on the workpiece. When longitudinal carriage 1 reaches the end of machining travel, which corresponds to the tool edge being at point 114 (FIG. 15), stop 115 actuates limit switch 116 (FIGS. 2 and 3) which through the electric system deenergizes solenoid 203 which actuates electrovalve 205 allowing oil to flow to chamber 111 of the hydraulic cylinder, causing copying carriage 4 to return in rapid traverse in a direction opposite to arrow 207, thus withdrawing from the workpiece.

Simultaneously with the return of copying carriage 4, limit switch 116 commands the reverse travel of longitudinal carriage 1 in rapid traverse, moving said longitudinal carriage from end of machining travel point 114 towards starting or resting point 107 (FIG. 15).

Upon completing the copying cycle, a program should be prepared for the thread cutting cycle as follows:

Turn electric selector switch 31 to "thread" position. This selector switch sets the electric controls, switches, relays, limit switches for thread cutting cycle, deenergizes solenoid 201, energizes solenoid 208 and actuates electrovalve 202 which lets the oil to discharge under pressure from chamber 86, causing copying valve 9 to assume its lower position, permitting that stylus 10 is at position I, that is, at the same plane of template 13, and then disengage carriage mechanical travel by positioning lever 105 on neutral, position leadscrew nut engaging lever 122 on "engaged" position, and press pushbutton 32 on panel 15 to start thread cutting cycle.

Figure 18:
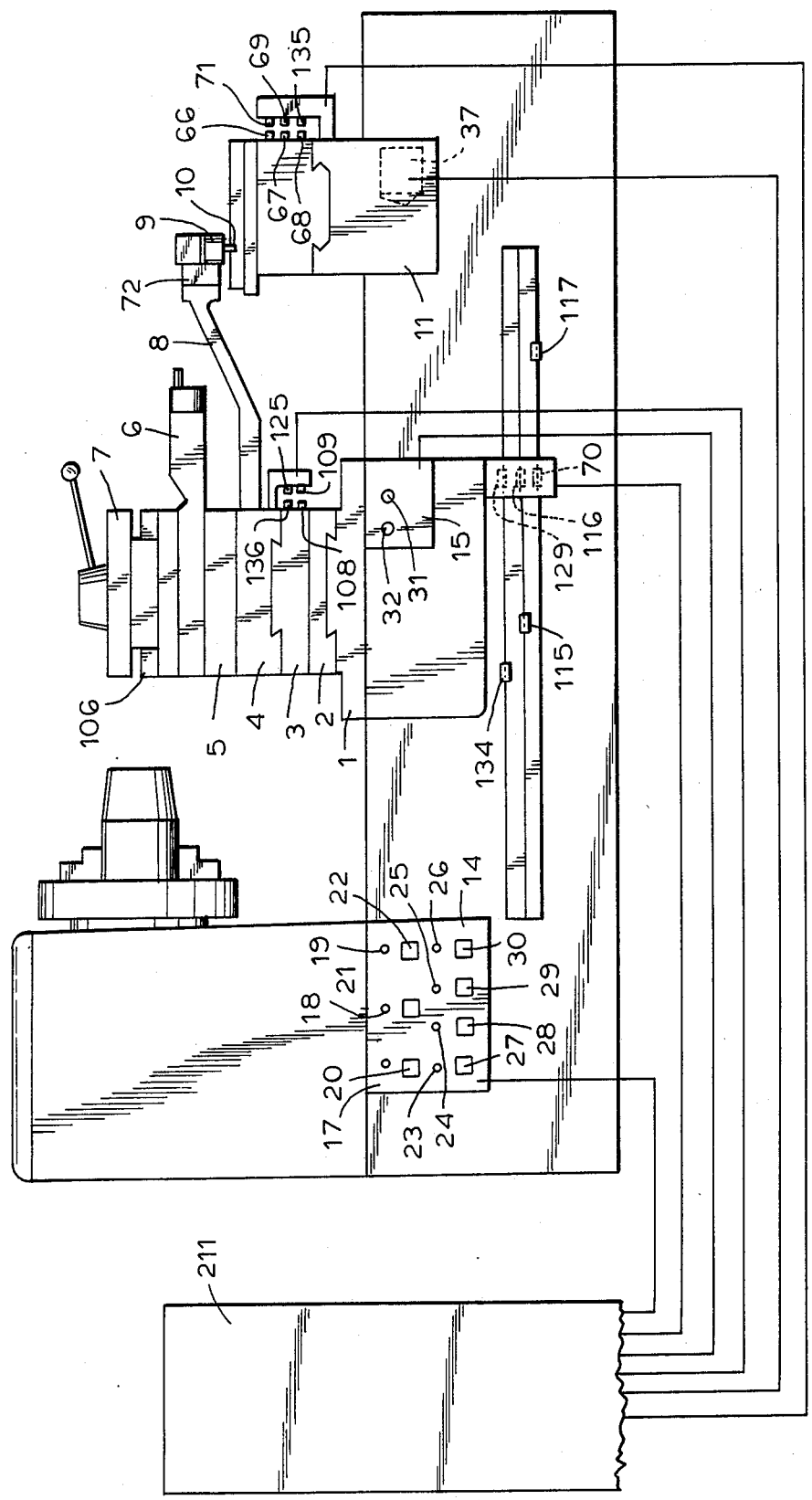
FIG. 18 is a view showing an electric control system used in the device.

The electric control system of device illustrated in FIG. 18, consists of a programming electric panel 14, control panel 15 and electric limit switches to control travel of longitudinal carriage, copying carriage 4 and templates support. These elements are connected to main electric panel 211, which contains electromagnetic switches and relays required to control the machine.

Programming panel 14 contains programming electric selector switches 17, 18 and 19 for selecting the number of passes and time relays 20, 21 and 22 for selecting depth of cut when in copying cycle, it also contains programming electric selector switches 23, 24, 25 and 26 for selecting the number of passes and time relays 27, 28, 29 and 30 for selecting depth of cut when in thread cutting cycle.

Electric selector switch 17 selects the number of passes under which time relay 20 is actuated, electric selector switch 18 selects the number of passes under which time relay 21 is actuated, and electric selector switch 19 selects the number of passes under which time relay 22 is actuated when in copying cycle. Electric selector switches 23, 24, 25 and 26 select the number of passes under which time relays 27, 28, 29 and 30 are actuated respectively when in thread cutting cycle. During each pass of the copying or thread cutting cycles the time relay programmed to actuate determines the period of time motor 37 should remain energized. Depending on the amount of current drawn by said motor 37, the displacement of the templates support 62 is limited by the period of time the time relays are set.

Control panel 15 is provided with electric switch 31 for selection of copying cycle or thread cutting cycle, and push button 32 for starting the machine in either cycle. Electric limit switches 129, 116 and 70 are used for limiting travel of copying carriage 4, and electric switches 71, 69 and 135 are for limiting travel of templates support.

The automatic square cycle performed by the cutting tool of the inventive device consists, as shown in FIG. 19, of successive movements of the cutting tool enabling that the tool tip traces a square, a rectangular or a trapezoid figure in space, that is, the tool tip departs from point "A:, travels the space between "A" and "B" to approach the workpiece, from "B" to "C" for machining, from "C" to "D" to draw from the workpiece, and from "D" to "A" to return to the starting point. This cycle is repeated as many times as necessary for machining the workpiece.

While the invention has been illustrated and described as embodied in an automatic square cycle copying and threading device, it is not intended to be limited to the details shown, since various modifications and structural changes may be made without departing in any way from the spirit of the present invention.

Without further analysis, the foregoing will so fully reveal the essence of the present invention that others by applying current knowledge can readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. Process for copying and threading in automatic square cycle, applicable to and/or incorporated into engine lathes in general, comprising the steps of: material removing machining of parts by copying method in automatic square cycle; providing during said machining step an automatic feed system for depth of cut with programmable and progressive increments through electric means; cutting of threads on a surface of the machined parts in automatic square cycle; providing during said cutting step an automatic feed system depth of cut with programmable and progressive increments through electric means; using two templates, one for cutting and the other for threading, which templates are not rigidly supported relative to a bed of a lathe; and moving the templates by a variable speed motor.

2. Process as defined in claim 1; further comprising the steps of pressing a starting electric button, rotating a main spindle and simultaneously moving a tool carriage from a starting or resting position at rapid traverse towards a workpiece impelled by oil that enters a chamber of a carriage hydraulic cylinder, until a stylus touches template profile, touching by the stylus of template profile and activating a copying valve piston, and taking by the copying valve piston when actuated a position that it distributes oil to two hydraulic cylinder chambers in quantity and pressure proportional to the areas of a cylinder and piston of said hydraulic cylinder in such a way to maintain the system balanced and to stop cross travel of the tool carriage at a start of cutting.

3. Process as defined in claim 2, further comprising the steps of moving a longitudinal carriage at slow working travel towards the workpiece with the cross travel of the tool carriage and longitudinal travel of the longitudinal carriage, starting the tool edge from the resting or starting point and travelling to start cutting, at this point interrupting cross travel of the tool carriage by contact of the stylus on the template profile, continuing moving the longitudinal carriage performing the path required for machining the workpiece, exploring during the path of the longitudinal carriage by the stylus the template profile and actuating with its movement the copying valve piston which controls oil flow in the two hydraulic cylinder chambers imposing a cross movement to the tool carriage, following by the cross movements of the tool carriage the shape of the template profile which profile is reproduced on the workpiece by the tool, reaching by longitudinal carriage the end of machining and therefore actuating a travel limit electric switch which energizes a solenoid which controls the valve for returning tool carriage cross movement in the opposite direction, withdrawing from the workpiece, actuating by the tool carriage upon returning at a certain point another travel limit electric switch which controls the reverse of the feed rod of longitudinal carriage at rapid traverse moving longitudinal carriage from end of machining towards the resting or starting point.

4. Device for copying and thread cutting in automatic square cycle, comprising: a longitudinal carriage; a cross slide having a bottom swivelling support and being attached to said longitudinal carriage; a copy carriage having an upper face, a corner, and being mounted to said bottom swivelling support of said cross slide; an upper swivelling support being fixed to said upper face of said copy carriage; a tool and a tool holder; a longitudinal support for said tool being equipped with said tool holder and being attached on said upper swivelling support; a movable first arm having a free end and being fixed at said corner of said copy carriage; a head being equipped with a copy valve having a stylus and an assembly mounting templates with two templates, one for cutting and the outer for threading, which templates are not rigidly supported to a bed and control movements of said longitudinal carriage; a variable speed motor arranged to move said templates; a programming panel; a hydraulic unit being mounted on said longitudinal carriage; a first set of time relays being mounted on said programming panel; a first set of electric switches for programming said first set of time relays of the automatic feed system for depth of cut when in copying cycle and being mounted on said programming panel; a second set of time relays being mounted on said programming panel; a second set of electric switches for programming said second set of time relays of the automatic feed system for depth of cut when in thread cutting cycle and being mounted on said Programming panel; and a control panel containing an electric selecting switching for pre-positioning of copy and thread cutting automatic cycles and a button for starting the automatic cycle.

5. Process for copying and threading in automatic square cycle, applicable to and/or incorporated into engine lathes in general, comprising the steps of material removing machining of parts by a copying method in automatic square cycle; providing during said machining step an automatic feed system for depth of cut with programmable and progressive increments through electric means; cutting of threads on a surface of the machined parts in automatic square cycle; providing during said cutting step an automatic feed system for depth of cut with programmable and progressive increments through electric means; pressing a starting electric button; rotating a main spindle and simultaneously moving a tool carriage from a starting or resting position at rapid traverse towards a workpiece impelled by oil that enters a chamber of a carriage hydraulic cylinder, until a stylus touches template profile; touching by the stylus of template profile and activating a copying valve piston, and taking by the copying valve piston when actuated a position that it distributes oil to two hydraulic cylinder chambers in quantity and pressure proportional to the areas of a cylinder and piston of said hydraulic cylinder in such a way to maintain the system balanced and to stop cross travel of the tool carriage at a start of cutting; moving a longitudinal carriage at slow working travel towards the workpiece with the cross travel of the tool carriage and longitudinal travel of the longitudinal carriage; starting the tool edge from the resting or starting point and traveling to start cutting; at this point interrupting cross travel of the tool carriage by contact of the stylus on the template profile; continuing moving the longitudinal carriage performing the path required for machining the workpiece; exploring during the path of the longitudinal carriage by the stylus the template profile and actuating with its movement the copying valve piston which controls oil flow in the two hydraulic cylinder chambers imposing a cross movement to the tool carriage; following by the cross movements of the tool carriage the shape of the template profile which profile is reproduced on the workpiece by the tool; reaching by longitudinal carriage the end of machining and therefore actuating a travel limit electric switch which energizes a solenoid which controls the valve for returning tool carriage cross movement in the opposite direction; withdrawing from the workpiece; actuating by the tool carriage upon returning at a certain point another travel limit electric switch which controls the reverse of the feed rod of longitudinal carriage at rapid traverse moving longitudinal carriage from end of machining towards the resting or starting point; actuating, when longitudinal carriage reaches the starting point, another travel limit electric switch which actuates simultaneously the electric switch that starts an electric motor that turns a screw that imposes movement to the template support through a nut coupled to this screw; controlling the electric switch the motor by an electric programming system consisting of selecting switch and time relays so that injecting electric current under controlled intensity by the motor and for a determined time the screw turns only a fraction and imposes a limited displacement to the template support as previously adjusted in the program system, with the template displacement the stylus taking a position on space which is different from the previous one and this resulting in a new position for the tool carriage when the stylus touches again the template profile, this displacement being increment of cut and corresponding to the depth of cut with which the tool must machine in the next pass, the start of the cross carriage towards the workpiece to be machined, the start of the longitudinal carriage towards the workpiece to be machined, being these movements successively repeated until the cross carriage reaches the programmed point as being the last pass and at this point it actuating another end of travel electric switch which is programmed for stopping the machine after the tool has performed the whole machining path and returned to the starting or resting point, upon completing the copying cycle, programming must be selected for the thread cutting cycle, so that the electric selecting switch is turned to position of thread cutting disengage carriage mechanical travel by positioning control lever in neutral, position lever for disengaging leadscrew nut in the engaged position, position thread box levers in accordance with the desired thread pitch, and turn square tool post to position thread cutting tool.

6. Process as defined in claim 5; further comprising the step of cutting thread cycle including the prepositioning phases of the end of travel electric switches, thus making possible that the tool machine only the section to be thread cut the depth of cut increments previously programmed in the electric panel which are different from those used for copying which increments are determined in accordance with the material, type of thread and tool used, longitudinal travel of carriage in both directions which is actuated by the lathe leadscrew, being the leadscrew reverse rotation controlled by a mechanism attached and/or incorporated to the lathe headstock.

7. Device for copying and thread cutting in automatic square cycle, comprising a longitudinal carriage; a cross slide having a bottom swivelling support and being attached to said longitudinal carriage; a copy carriage having an upper face, a corner, and being mounted to said bottom swivelling support of said cross slide; an upper swivelling support being fixed to said upper face of said copy carriage; a tool and a tool holder; a longitudinal support for said tool being equipped with said tool holder and being attached on said upper swivelling support; a movable first arm having a free end and being fixed at said corner of said copy carriage; a head being equipped with a copy valve having a stylus and an assembly mounting templates; a programming panel; a hydraulic unit being mounted on said longitudinal carriage; a first set of time relays being mounted on said programming panel; a first set of electric switches for programming said first set of time relays of the automatic feed system for depth of cut when in copy cycle and being mounted on said programming panel; a second set of time relays being mounted on said programming tool; a second set of electric switches for programming said second set of time relays of the automatic feed system for depth of cut when in thread cutting cycle and being mounted on said programming tool; and a control panel containing an electric selecting switch for pre-positioning of copy and thread cutting automatic cycles and a bottom for starting the automatic cycle, said assembly mounting templates comprising a base guided on a main guideway of the lathe bed, a first support being slidable on first guideways on said base, said guideways being at right angle to the lathe bed prism and which can be of metal to metal contract or provided with anti-friction linear bearings, the displacement of said first support being servo-assisted through an electric motor fixed on said base with a shaft of said motor connected to a worm and a worm wheel having a guide screw which coupled to a nut which in turn is connected to an arm through a bushing, said arm mounted on said first support being slidable in relation to said base when rotating movement is impelled to said motor, a second support being slidable on second guideways positioned on an upper face of said first support, said second guideways being parallel to the displacement of said first support said first support being provided with a first knob and first dial mounted together on a first screw through a first key, and a second screw being coupled to a first thread existing on the body of said first support and on the other side supported by a first bearing, which in its turn is mounted on said second support through third screws, while a third support being slidable on third guideways being disposed on the upper face of said second support positioned at right angle to the direction of displacement of said support which is provided with a second knob and a second dial, which is jointly mounted on a fourth screw through a second key and a fifth screw, said fourth screw being coupled on one of its end to a second thread on the body of said third support and on the other end rested on a second bearing which is connected to said second support through sixth screws.

8. Device as defined in claim 7; further comprising a swivelling support displaying templates on the upper section on said support and pivoted on a pin, a pointed indicator disposed at the end of a plate mounted on said swivelling support through seventh screws but equally mounted on an angular graduation stamped on the upper face of said support on which it is mounted said swivelling support through eighth screws and nuts, an assembly of end of travel limit switches consisting of micro switches mounted on said fourth support and a fifth support provided with adjustable dogs being mounted on said first support while at the end of said arm it is provide a head for positioning said copying valve in three different positions, said head including a body guided and slidable on four guideways existing on said arm and having in its interior a hole shaped like a chamber or hydraulic cylinder with two different diameters where there is a rod, a lower cover, a piston bushing, a piston, and a top cover, which incorporates on its upper part arm and in a hole existing on said first arm being located a spring and a pin, and at the lower section of said first arm it is connected a second arm on which end it is connected said rod and entering chambers having discharge holes.

9. Device as defined in claimed claim 7; further comprising an alternative cross support changeable into a copying carriage and said copying carriage changed into a support servo-assisted by the automatic mechanical feed system for depth of cut in an incremental way and pre-programmed through 6 electric means, and having said longitudinal carriage on which there is a servo-assisted support, said upper swivelling support, said longitudinal support and said tool holder, a support connected to the lathe bed with the function of supporting assembly where said templates are mounted, on a cross support it is connected or incorporated a hydraulic copying cylinder which rod of piston is connected to an arm which is connected to the body of said longitudinal carriage, on said cross support it is connected an arm on which end is a head supporting said copying valve, said servo-assisted support is rested, guided and slidable on guideways existing on the upper face of lower swivelling support, being the displacement of said servo-assisted support actuated through a ninth screw, a second nut, a second worm gear and a second worm screw through motor which is connected to said lower swivelling support.

* * * * *